United States Patent
Chakkassery Vidyadharan et al.

(10) Patent No.: US 11,126,523 B1
(45) Date of Patent: Sep. 21, 2021

(54) AGENT-BASED MONITORING OF NETWORK RESOURCES

(71) Applicant: Equinix, Inc., Redwood City, CA (US)

(72) Inventors: Vishnu Prasad Chakkassery Vidyadharan, Sunnyvale, CA (US); Loveneesh Bansal, San Jose, CA (US); Vaibhav Pralhad Bhosale, San Jose, CA (US); Greg Alan Ogle, Highlands Ranch, CO (US)

(73) Assignee: Equinix, Inc., Redwood City, CA (US)

( * ) Notice: Subject to any disclaimer, the term of this patent is extended or adjusted under 35 U.S.C. 154(b) by 56 days.

(21) Appl. No.: 16/779,130

(22) Filed: Jan. 31, 2020

Related U.S. Application Data

(62) Division of application No. 15/712,525, filed on Sep. 22, 2017, now Pat. No. 10,558,541.

(51) Int. Cl.
*G06F 11/30* (2006.01)
*G06F 11/00* (2006.01)

(52) U.S. Cl.
CPC ........ *G06F 11/3006* (2013.01); *G06F 11/004* (2013.01); *G06F 11/008* (2013.01); *G06F 11/301* (2013.01)

(58) Field of Classification Search
CPC .... G06F 11/004; G06F 11/008; G06F 11/301; G06F 11/3006
See application file for complete search history.

(56) References Cited

U.S. PATENT DOCUMENTS

| | | | |
|---|---|---|---|
| 6,704,874 B1 | 3/2004 | Porras et al. | |
| 6,934,745 B2 | 8/2005 | Krautkremer | |
| 7,627,671 B1 | 12/2009 | Palma et al. | |
| 7,916,652 B1 | 3/2011 | Lima et al. | |
| 7,962,633 B1 | 6/2011 | Sidebottom et al. | |
| 7,984,073 B1 | 7/2011 | Basiago | |
| 8,635,319 B1 * | 1/2014 | Cuthbert | H04L 43/10 709/223 |
| 8,719,804 B2 | 5/2014 | Jain | |
| 9,069,737 B1 | 6/2015 | Kimotho et al. | |

(Continued)

OTHER PUBLICATIONS

Bansal et al., "Enterprise Monitoring Explained: How Monitoring the Enterprise Becomes an Opportunity for Greater Customer Satisfaction," blog.equinix.com, Mar. 7, 2017, 8 pp.

(Continued)

*Primary Examiner* — Jonathan A Bui

(74) *Attorney, Agent, or Firm* — Shumaker & Sieffert, P.A.

(57) ABSTRACT

This disclosure describes, in some examples, a monitoring platform to provide integrated system that ingests, correlates, and provides alerts for monitored data relating to nodes, which may include applications, services, containers, and network components. In one example, this disclosure describes a method that includes receiving, by a computing system in a network, criticality information about a node included within the network; identifying, by the computing system, a status change associated with the node; determining, by the computing system and based on the criticality information about the node, an impact resulting from the status change; determining, by the computing system and based on the determined impact, whether to communicate information about the determined impact; and sending, by the computing system, an alert about the determined impact.

20 Claims, 13 Drawing Sheets

(56) References Cited

U.S. PATENT DOCUMENTS

| | | |
|---|---|---|
| 9,449,278 B2 | 9/2016 | Davlos et al. |
| 9,479,414 B1 | 10/2016 | Rustad |
| 9,557,879 B1 | 1/2017 | Wang et al. |
| 9,712,410 B1 | 7/2017 | Char et al. |
| 10,050,851 B2 | 8/2018 | Medhi |
| 10,069,757 B1 | 9/2018 | Young |
| 10,127,146 B2 | 11/2018 | Morello et al. |
| 10,127,273 B2 | 11/2018 | Dickey |
| 10,187,260 B1 | 1/2019 | Chen et al. |
| 10,200,252 B1 | 2/2019 | Qin et al. |
| 10,212,215 B2 | 2/2019 | Muraleedharan et al. |
| 10,223,131 B1 | 3/2019 | Lieberman et al. |
| 10,230,601 B1 | 3/2019 | Qin et al. |
| 10,237,149 B1 | 3/2019 | Guo et al. |
| 10,270,668 B1 | 4/2019 | Thompson et al. |
| 10,291,493 B1 | 5/2019 | Rustad et al. |
| 10,333,820 B1 | 6/2019 | Wang et al. |
| 10,355,912 B2 | 7/2019 | Deb et al. |
| 10,374,900 B2 | 8/2019 | Dujodwala et al. |
| 10,397,370 B2 | 8/2019 | Tak et al. |
| 10,409,920 B1 | 9/2019 | Harwood et al. |
| 10,462,004 B2 | 10/2019 | Hsiao et al. |
| 10,558,541 B1 | 2/2020 | Vidyadharan et al. |
| 2003/0177228 A1 | 9/2003 | Vigouroux et al. |
| 2003/0225876 A1 | 12/2003 | Oliver et al. |
| 2005/0198275 A1* | 9/2005 | D'Alo ................ G06F 11/3466 709/224 |
| 2006/0136582 A1 | 6/2006 | Mills |
| 2006/0242282 A1 | 10/2006 | Mullarkey |
| 2007/0008879 A1 | 1/2007 | Wallenius |
| 2010/0042723 A1 | 2/2010 | Sundarrajan et al. |
| 2011/0258621 A1 | 10/2011 | Kern |
| 2012/0167094 A1 | 6/2012 | Suit |
| 2013/0014107 A1 | 1/2013 | Kirchhofer |
| 2013/0159395 A1* | 6/2013 | Backholm ......... H04L 29/08099 709/203 |
| 2013/0227116 A1 | 8/2013 | Radhakrishnan |
| 2013/0346899 A1 | 12/2013 | Cole et al. |
| 2014/0006955 A1 | 1/2014 | Greenzeiger et al. |
| 2014/0089339 A1 | 3/2014 | Siddiqui et al. |
| 2014/0342705 A1 | 11/2014 | Harris et al. |
| 2015/0006634 A1* | 1/2015 | Gong .................... G06Q 50/01 709/204 |
| 2015/0195157 A1 | 7/2015 | Nayyar et al. |
| 2015/0358391 A1 | 12/2015 | Moon et al. |
| 2015/0378763 A1* | 12/2015 | Hassine .................. G06F 8/61 718/1 |
| 2016/0020955 A1* | 1/2016 | Bunch, Jr. .......... H04L 41/0893 709/223 |
| 2016/0087859 A1 | 3/2016 | Kuan et al. |
| 2016/0087861 A1 | 3/2016 | Kuan et al. |
| 2016/0094422 A1 | 3/2016 | Poola et al. |
| 2016/0226731 A1 | 8/2016 | Maroulis |
| 2016/0314064 A1 | 10/2016 | Moretto et al. |
| 2017/0019312 A1 | 1/2017 | Meyer et al. |
| 2017/0181645 A1 | 6/2017 | Mahalingam et al. |
| 2017/0244607 A1 | 8/2017 | Dujodwala et al. |
| 2018/0004590 A1 | 1/2018 | Johnson et al. |
| 2018/0024901 A1* | 1/2018 | Tankersley .......... G06F 16/2379 707/694 |
| 2018/0039516 A1 | 2/2018 | Biran et al. |
| 2018/0046510 A1* | 2/2018 | Boss .................. G06F 11/3024 |
| 2018/0316581 A1 | 11/2018 | Okwii et al. |
| 2018/0341566 A1 | 11/2018 | Harutyunyan et al. |
| 2018/0373580 A1* | 12/2018 | Ertl .................... G06F 11/0754 |
| 2019/0095247 A1* | 3/2019 | Shimamura .......... G06F 9/4881 |
| 2019/0222481 A1 | 7/2019 | Hira |
| 2019/0265971 A1 | 8/2019 | Behzadi et al. |
| 2020/0004600 A1 | 1/2020 | Acker et al. |
| 2020/0019485 A1* | 1/2020 | Moradi ............... G06F 11/3055 |
| 2021/0112017 A1* | 4/2021 | Gupta .................... H04L 43/08 |

OTHER PUBLICATIONS

Prosecution History from U.S. Appl. No. 15/712,525, dated May 15, 2019 through Oct. 2, 2019, 14 pp.

U.S. Appl. No. 15/824,861, filed Nov. 28, 2017, by Vidyadharan et al.

Prosecution History from U.S. Appl. No. 15/824,861, dated Jan. 8, 2020 through Apr. 21, 2020, 39 pp.

* cited by examiner

AGENT-BASED MONITORING OF NETWORK RESOURCES

CROSS REFERENCE

This application is a divisional application of and claims priority to U.S. patent application Ser. No. 15/712,525 filed on Sep. 22, 2017, which is hereby incorporated by reference in its entirety.

TECHNICAL FIELD

This disclosure relates to computer networks, and more specifically, to monitoring and optimizing the performance of one or more aspects of the network.

BACKGROUND

Enterprise networks, especially large enterprise networks, require significant efforts to maintain and administer. Applications, processes, services, and other aspects of an enterprise application may, at times, exhibit poor performance and/or become inoperable. Identifying and diagnosing the cause of the poor performance or inoperability is often not easy. Some enterprise networks are configured to send alerts to network administrators when a performance issue arises, but such alerts are not always reliable or informative.

SUMMARY

In one example, this disclosure describes a method comprising receiving, by a computing system in a network, criticality information about a node included within the network; identifying, by the computing system, a status change associated with the node; determining, by the computing system and based on the criticality information about the node, an impact resulting from the status change; determining, by the computing system and based on the determined impact, whether to communicate information about the determined impact; and sending, by the computing system, an alert about the determined impact.

In another example, this disclosure describes a method comprising determining, by a computing system, a criticality assessment for each of a plurality of nodes within a network; configuring, by the computing system, a plurality of agents executing on a plurality of hosts within the network, wherein the plurality of agents are configured, based on the criticality assessments, to monitor at least some of the plurality of nodes for status changes; receiving, by the computing system, information about a new node has been added to the network; determining, by the computing system, for an affected node, an updated criticality assessment; and reconfiguring, by the computing system and based on the updated criticality assessment, an agent included within the plurality of agents that monitors the affected node.

In another example, this disclosure describes a system comprising a storage device; and processing circuitry having access to the storage device and configured to: receive criticality information about a node included within a network, identify a status change associated with the node, determine, based on the criticality information about the node, an impact resulting from the status change, determine, based on the determined impact, whether to communicate information about the determined impact, and send an alert about the determined impact.

In another example, this disclosure describes a system comprising a storage device; and processing circuitry having access to the storage device and configured to: determine a criticality assessment for each of a plurality of nodes within a network, configure a plurality of agents executing on a plurality of hosts within the network, wherein the plurality of agents are configured, based on the criticality assessments, to monitor at least some of the plurality of nodes for status changes, receive information about a new node has been added to the network, determine, for an affected node, an updated criticality assessment, and reconfigure, based on the updated criticality assessment, an agent included within the plurality of agents that monitors the affected node.

DETAILED DESCRIPTION

Figure 1A:
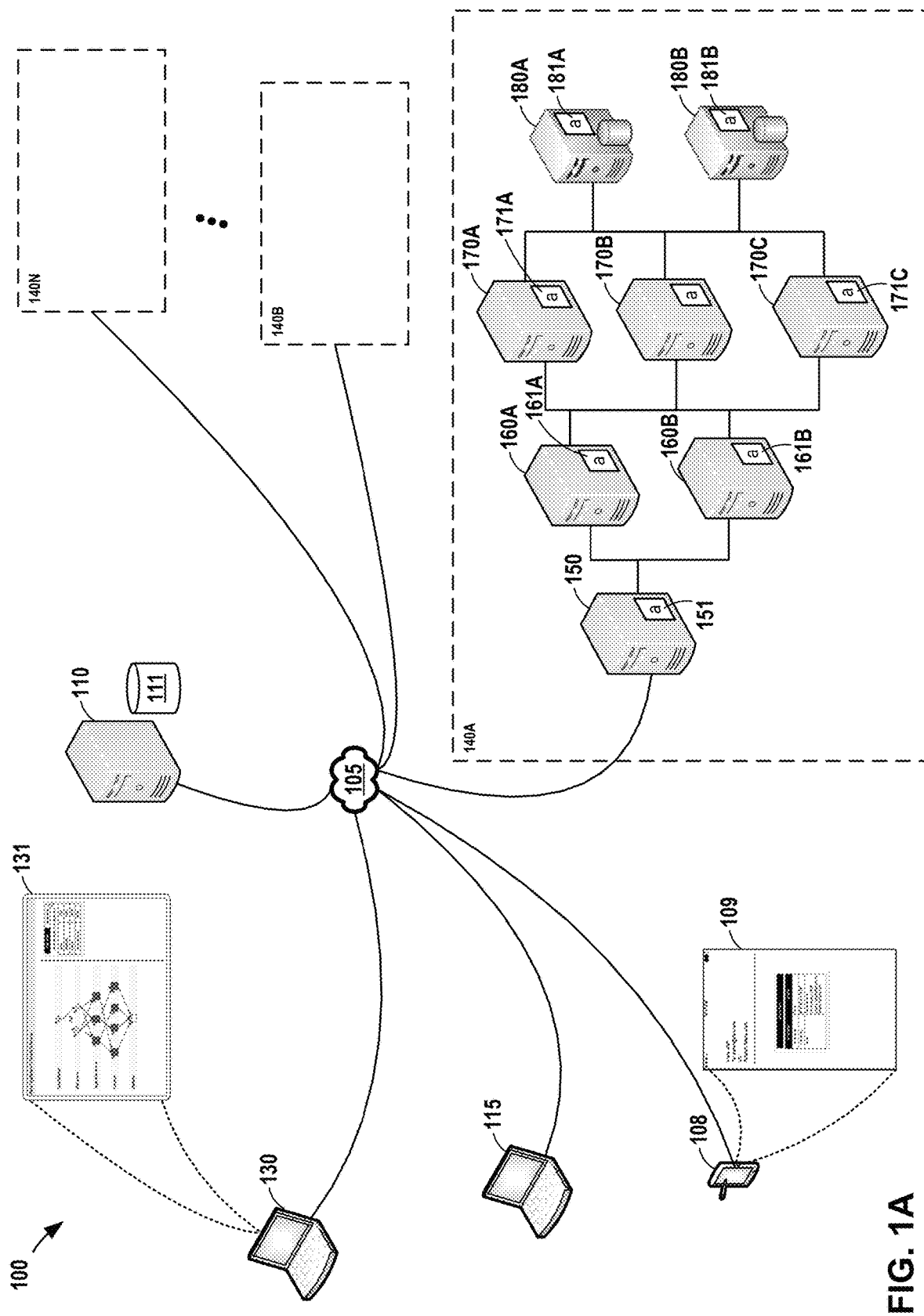
FIG. 1A and FIG. 1B are conceptual diagrams illustrating example systems in which one or more enterprise applications are executing in a computing environment, in accordance with one or more aspects of the present disclosure.

This disclosure describes, in some examples, a monitoring platform to provide integrated system that ingests, correlates, and provides alerts for monitored data relating to nodes, which may include applications, components (infrastructure), services, containers, and network components. In some examples described herein, monitoring of all the nodes, services, and applications is not only done independently, but is also performed by correlating the monitoring with other nodes, services, and applications. A hierarchy diagram format may be used to illustrate, in a user interface, services that correlate with other services, and that are monitored in a correlated way. For instance, techniques are described for monitoring a hierarchical system of one or more web servers, application servers, coherent servers, and database servers in a correlated way by pinging each component and evaluating the response. In some examples, a central unit for monitoring that uses a pull mechanism for collecting data is not necessary.

Systems described herein may monitor a wide range of nodes, which may include services, applications, and network components and their availability by, for example, not only checking endpoints, but also internal parameters and aspects of such nodes.

Systems described herein may also have the ability to analyze the impact of any outage by applying an intelligent algorithm for calculating the impact on services affected by any outage. If there is any outage in a node, for example, the algorithm will calculate its impact on the associated service, analyze the impact on the overall application, and analyze the impact on any other application associated with the node and the computing infrastructure. In this way, it may be possible to accurately assess the impact of any particular outage so that it can be dealt with accordingly.

In some examples, agents are deployed at the edges of the network and are initially configured to operate autonomously, although the agents can be controlled or configured in a remote and/or centralized manner. When an outage is detected, one or more agents may be configured to send an alert to a network administrator, without routing the alert or information underlying the alert through a centralized alerting system. Accordingly, alerts sent by the agents may be sent in a near or seemingly near real-time manner.

Agents may also be configured to automatically discover any new service starting on a host, and automatically add the new service to the network's service hierarchy, along with any corresponding flow of traffic. This process may be performed by requiring little or no human interaction, as most of the tasks performed by the agents are performed autonomously. User interfaces presented based on the network's service hierarchy may also be similarly updated in an automated fashion.

Automatic discovery of new nodes, services, and/or applications may involve application of rules, templates, discovery templates, and mapping templates. Rules are set of explicit or understood regulations or principles governing conduct within a particular activity. Templates are a set of rules, used so that the format does not have to be recreated each time it is used. Templates can be classified as either "discovery templates," or "mapping templates." Discovery Templates generally include several sets of rules that determine how the discovered new node/service will be classified. Mapping Templates generally include a set of rules that determine how the discovered new node/service will be mapped into a hierarchy diagram.

Accordingly, this disclosure describes, in some examples, techniques for monitoring a full range of the services and layers of applications deployed in an enterprise network, both monitored individually as well as with respect to each other. In some examples, the monitoring is done without requiring a central monitoring unit, which may reduce latency in performing the monitoring. In some examples, techniques for not only performing endpoint monitoring, but also for performing monitoring on components within the network, such as ports, URLs, processes, servers, network components, and containers.

This disclosure further describes an alerting platform in which an intelligent impact analyzer algorithm is used to provide not only alerts when an outage occurs, but also provide information about any services affected by the outage and its impact on the overall system. By using a decentralized approach for enterprise level monitoring using agents to monitor services deployed on the network, the monitoring can be performed independently without any single point of failure. The monitoring can also be performed remotely, while still being controlled or configured by an administrator or another configuration device if required. A number of different types of alerts are described, including near or seemingly near real-time alerts based on severity and/or priority and threshold-based alerts.

Also described are autonomous discovery techniques that enable the discovery of services across edges, and/or automatic detection of any new service in the hierarchy diagram along with the flow of traffic.

At least some prior art enterprise networks and applications are monitored using a centralized approach, which often lacks the capability to perform real-time alerting, typically because processing is required before the alert can be sent to a network administrator). Moreover, some enterprise monitoring systems only perform endpoint monitoring for all the services and applications deployed in the network. Such endpoint monitoring might only monitor outcomes, without regard to how any event impacts the system in a correlated way. Also, an event may affect a significant number of the services being provided, and there may also be a significant impact on the entire system, but endpoint monitoring systems might not provide useful information about such impacts. Also, in prior monitoring systems, when a new service is added, manual and tedious efforts are often required to deploy the new service, consuming significant administrator time and causing reduced efficiency. Often, with prior systems, it is very difficult, if not impossible, to monitor an entire system, including all its ports, services and applications, in one platform simultaneously.

Prior art monitoring systems sometimes use a centralized monitoring approach, which is often not only inefficient, but also lacked many capabilities for effective monitoring. In some cases, a centralized system architecture results in only a view (e.g., 20%) of the entire system, which makes monitoring all the nodes, services, applications and all other infrastructure simultaneously in a correlated way very difficult.

Further, prior art monitoring systems also tend to be unable to perform threshold-based alerting, and also unable to perform impact analyzing using an intelligent algorithm capable of providing intelligent alerts along with an assessment of the impact of the outage. Often, alerts sent by prior art systems were not prioritized appropriately, if at all.

Still further, prior art monitoring systems may also be based on a design that results in a single point of failure, meaning that if certain components are rendered inoperable, the whole alerting system is susceptible to being taken offline. This can lead to the dreadful situation where the alerting system is not providing any alerts for a significant outage.

Advantages realized by techniques described herein may include:

1) A user interface that provides a single pane of glass, providing a view of monitoring data for the applications across nodes, layers, services, and the like. Such a user interface may help reduce mean time to investigate (MTTI) and mean time to resolve (MTTR) issues, thereby improving the developer productivity and service quality.

2) A capability for monitoring services in a hierarchical fashion, thereby enabling a network administrator to monitor several layers of a service simultaneously. User interface elements can provide information can provide a dashboard of information about the status and upkeep of services without the need for manually checking all the services thoroughly, and thereby reducing significant time consumption in performing monitoring tasks.

3) Monitoring is performed not only at the endpoint of services but also services are monitored by the agents in an autonomous way with minimal human intervention. The monitoring is performed for some or the servers, networks, storage, and other components.

4) An intelligent impact analyzer algorithm is used to provide the impact of an outage on the whole system (i.e. the impact of any outage may provide the impact analysis relating to the service, as well the impact analysis relating to the overall application).

5) Autonomous agents are placed in or with the applications in a manner such that they are spread across the network in a decentralized way. The agents operate to check the availability of every service. In case of any outage, the agents act in an autonomous way to alert a network administrator without, in some cases, engaging a centralized system, and thereby efficiently communicating the alert.

6) Automatic discovery of new services and automatically determining the service's place in any hierarchical service structure, and any corresponding hierarchical user interface.

Figure 1B:
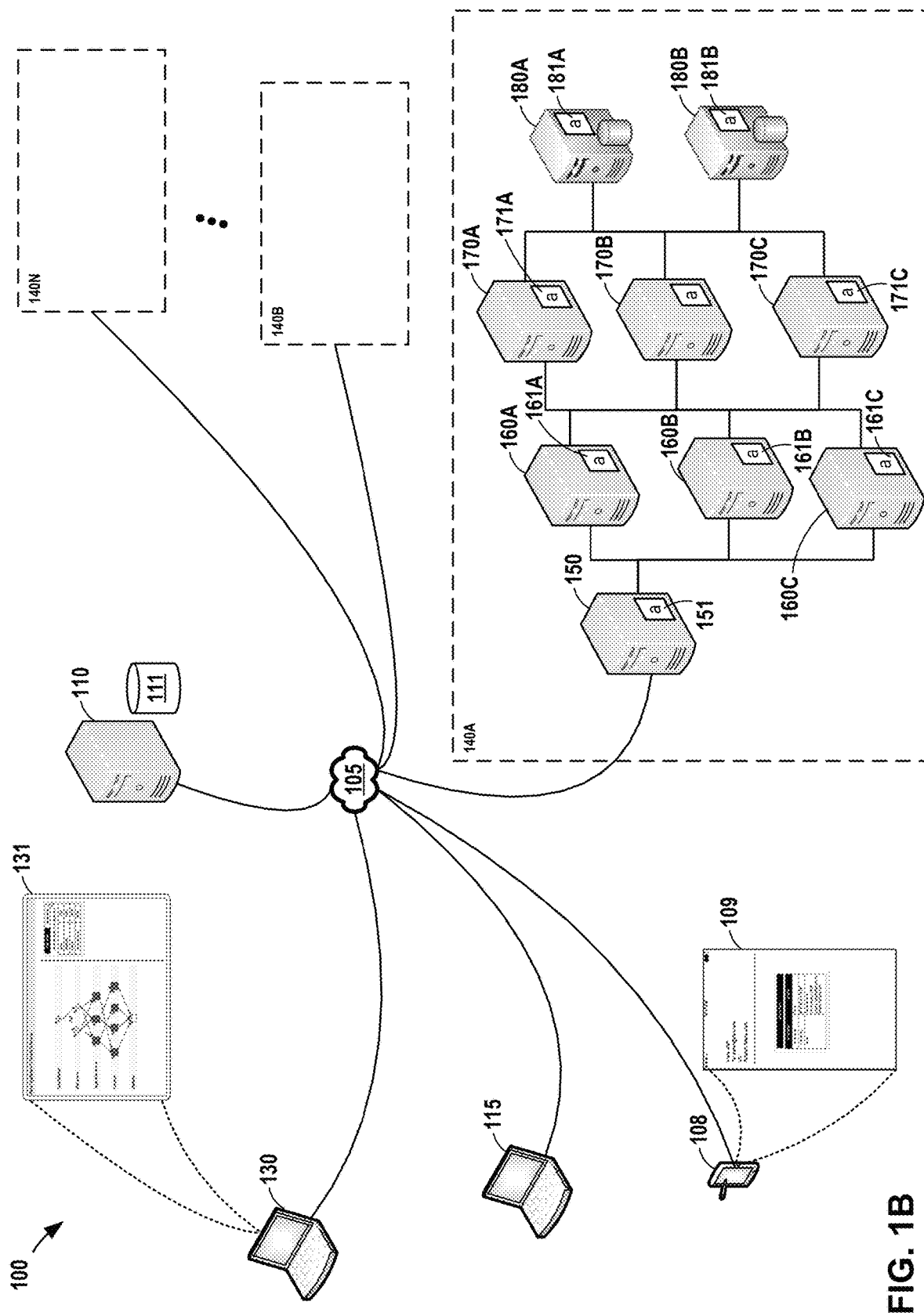

FIG. 1A and FIG. 1B are conceptual diagrams illustrating example systems in which one or more enterprise applications are executing in a computing environment, in accordance with one or more aspects of the present disclosure. In the example of FIG. 1A, system 100 includes one or more mobile devices 108 and one or more client devices 115 connected, via network 105, with data center stacks or data center platforms 140A through 140N. Each platform 140A through platform 140N may represent a collection of hardware devices, software components, and/or data stores that can be used to implement one or more applications or services within a data center or across data centers.

In this disclosure, platform 140A through platform 140N may be collectively referred to as "platforms 140," and may represent any number of platforms. Similarly, for other components, devices, modules, or other items that are illustrated or described herein using a similar numbering and letter convention, such components, devices, modules, or items may correspondingly be referred to collectively in a similar fashion, and may represent any number of such components, devices, modules, or items.

Each of platforms 140 may include one or more physical or virtual computing devices. In the example of FIG. 1A, platform 140A includes load balancer 150, web servers 160, application servers 170, and databases 180. Platform 140B through platform 140N may be similarly configured, although for ease of illustration, no devices are shown within platform 140B through platform 140N in FIG. 1A or FIG. 1B. In FIG. 1A, one load balancer 150 and two web servers 160 are shown within platform 140A, although in other examples, any number of load balancers 150 and web servers 160 may be used. Similarly, in the example of FIG. 1A, application servers 170 includes application server 170A, application server 170B, and application server 170C. In other examples, a different number of application servers 170 may be deployed. Further, FIG. 1A illustrates database 180A and database 180B, but a different number of databases 180 may be used in other examples. FIG. 1B corresponds to FIG. 1A after the web server 160C has been deployed within platform 140A.

In both FIG. 1A and FIG. 1B, system 100 further includes central monitoring system 110. As described herein, central monitoring system 110 performs functions relating monitoring, criticality assessment, and/or performance management for system 100 in accordance with one or more aspects of the present disclosure. Central monitoring system 110 interacts with one or more monitoring agents that are deployed within platforms 140. Monitoring agents may monitor the operation and/or resource usage of various nodes within platforms 140. Monitoring agents may also monitor activity and/or communications between platforms 140 within system 100, and/or otherwise within system 100. As used herein, a "node" refers to any device, component, or system capable of being monitored, including load balancers, servers, ports, URLs, applications, processes, interfaces between applications or processes, containers, virtual machines, databases or data stores, network components, or other components illustrated in the figures.

One or more nodes may be included within platforms 140. Such nodes or platforms may include virtual and physical computing devices. In some examples, each virtual or physical computing device may include a monitoring agent. For example, as shown in the example of FIG. 1A, load balancer 150 includes monitoring agent 151, which is a module that monitors one or more aspects of load balancer 150. Similarly, monitoring agents 161 (monitoring agent 161A and monitoring agent 161B) execute on web server 160A and web server 160B ("web servers 160") and monitor one or more aspects of web servers 160. Monitoring agents 171 execute on application servers 170 and monitor one or more aspects of application servers 170. Monitoring agents 181 execute on databases 180 and monitor one or more aspects of databases 180. In some examples, each of monitoring agent 151, monitoring agents 161, monitoring agents 171, and/or monitoring agents 181 run on a low-level computing infrastructure of platform 140A that provides computational resources to execute applications. In other words, one or more of monitoring agent 151, monitoring agents 161, monitoring agents 171, and/or monitoring agents 181 may execute on a bare-metal host device, a virtual machine, a container, or the like.

An additional client device 130 illustrated in FIG. 1A and FIG. 1B may be operated by a network administrator. In some examples, client device 130 may present one or more user interfaces 131, providing information, visibility, and services relating to and/or facilitating monitoring of aspects of system 100.

In the example of FIG. 1A, platform 140 may provide services to users of one or more client devices 115. For instance, in the example of FIG. 1A, network 105 receives a signal originating from a client device (e.g., client device 115) operated by an end user, and directs the signal to load balancer 150. Load balancer 150 detects a request over network 105 originating from client device 115. Load balancer 150 determines that the request specifies a network address or URL. Load balancer 150 load balances the request to one of web servers 160, such as web server 160A. Web server 160A analyzes the request and directs the request to one of application servers 170, based on the service associated with the request. In one example, web server 160A directs the request to application server 170B. Application server 170B processes the request by performing computing operations called for by the request. In some examples, application server 170B may process the request through execution of one or more microservices, virtual machines, or containers executing on application servers 170B. Application server 170B responds to the request by sending a responsive signal through one or more of web servers 160 (e.g., web server 160A), through load balancer 150, and through network 105 to the originally-requesting client device 115.

In accordance with one or more aspects of the present disclosure, central monitoring system 110 may gather information about system 100 from one or more sources. For instance, in some examples, central monitoring system 110 may collect information about system 100 based on user input. In the example of FIG. 1, central monitoring system 110 detects input over network 105 that it determines corresponds to a signal from client device 130. The signal may correspond to input from a user of client device 130, operated by a network administrator configuring central monitoring system 110. Central monitoring system 110 determines that the signal includes information about system 100. Central monitoring system 110 further determines that the signal includes a description of the structure, arrangement, hierarchy, and/or configuration of one or more platforms 140. In the example of FIG. 1, the information specifies that for platform 140A, load balancer 150 load balances service requests received over network 105 to two web servers 160 (e.g., web server 160A and web server 160B). The information further specifies that platform 140A includes three application servers 170 and two databases 180. The information may also contain information about nodes, including ports, URLs, processes, applications, servers, virtualized computing instances (e.g., virtual machines and containers) executing on one or more computing devices within platform 140A, and other information. Similarly, the information may include information about nodes included within other platforms 140, including platform 140B through platform 140N. Central monitoring system 110 may store some or all of the information in data store 111.

Alternatively, or in addition, central monitoring system 110 may gather information about system 100 based on information received from one or more components or computing devices within system 100. For instance, in the example of FIG. 1A, one or more monitoring agents executing on load balancer 150, web servers 160, application servers 170, databases 180, and/or other computing devices may send one or more signals over network 105. Central monitoring system 110 may detect one or more signals, and determine that the signals correspond to information about the configuration of platform 140A. The information may describe the structure, arrangement, hierarchy, and/or configuration of the nodes within platform 140A. Central monitoring system 110 may also detect one or more signals over network 105 and determine that the signals correspond to information about the configuration of platform 140B through platform 140N. The information received by central monitoring system 110 may be in response to a query issued by central monitoring system 110 over network 105, or may be independently reported by devices, components, computing devices of platforms 140, and/or monitoring agents executing on such devices, components, and/or computing devices. Central monitoring system 110 may store some or all of the information in 111.

Central monitoring system 110 may make a criticality assessment of components of system 100. For instance, in the example of FIG. 1A, central monitoring system 110 may use information stored within data store 111 to determine the hierarchy of the nodes and/or components and systems included within each of platforms 140, and relationships between various such nodes, components, and systems. Central monitoring system 110 may determine, for example, that since platform 140A includes two web servers, each of web servers 160 shares 50% of the load balanced by load balancer 150. If one of web servers 160 were to become inoperable, the functions performed by each of the web servers 160 would be impacted at a rate of 50%. Accordingly, in some examples, central monitoring system 110 may determine that each of web servers 160A and web server 160B has criticality factor of 50%. In another example, if there were three web servers 160 within platform 140, central monitoring system 110 may determine that each of web servers 160 has a criticality factor of 33%. For four web servers 160, central monitoring system 110 may determine that each of web servers 160 has a criticality factor of 25%. Similarly, central monitoring system 110 may make criticality assessments for other nodes and/or devices within platform 140A, such as load balancer 150, application servers 170, and/or databases 180. In addition, central monitoring system 110 may perform similar criticality assessments for components and/or devices within each of platforms 140 illustrated in FIG. 1A.

Central monitoring system 110 may configure one or more monitoring agents executing on computing devices associated with platforms 140. For instance, in the example of FIG. 1A, central monitoring system 110 may output a signal over network 105. Monitoring agent 151 executing on load balancer 150 detects a signal over network 105. Monitoring agent 151 determines that the signal includes information about what aspects of load balancer 150 to monitor and/or how and when to report status changes, such as error conditions, resource utilization changes, and other changes associated with load balancer 150 or any processes, applications, or virtual computing instances executing on monitoring agent 151. Monitoring agent 151 may store, internally, some of all of the information received from central monitoring system 110. In a similar manner, central monitoring system 110 may communicate configuration information to one or more other monitoring agents associated with other nodes or computing devices within platform 140A, such as web servers 160, application servers 170, and/or databases 180. Central monitoring system 110 may also communicate configuration information one or more monitoring agents 151 associated with devices, components, and/or computing devices within other platforms 140, including platform 140B through platform 140N.

Alternatively, or in addition, central monitoring system 110 may communicate information about the criticality assessments to one or more monitoring agents executing on computing devices associated with platforms 140. For instance, in the example of FIG. 1A, central monitoring system 110 may output a signal over network 105. Monitoring agent 171A executing on application server 170A detects a signal over network 105. Monitoring agent 171A determines that signal includes information about the criticality of application server 170A and/or one or more nodes, components, ports, URLs, processes, applications, or virtualized computing instances executing at application server 170A. Monitoring agent 171 may store some or all of the information received from central monitoring system 110 so that monitoring agent 171 has access to information about its own criticality. In a similar manner, central monitoring system 110 may communicate information about the criticality of other components, devices, and/or applications of platforms 140A to monitoring agents executing within platform 140A. Further, central monitoring system 110 may also communicate information about the criticality of components, devices, and/or applications of other platforms 140 (e.g., platform 140B through platform 140N). In this manner, some or all monitoring agents within system 100 are provided with information sufficient to determine or assess the criticality of some or all of the components, devices, and/or applications within system 100.

One or more monitoring agents may execute on computing devices within system 100 and monitor nodes within platforms 140. For instance, in the example of FIG. 1A, monitoring agent 151 monitors various aspects of load balancer 150, including ports, URLs, processes, and any applications, and/or virtualized computing instances that may be executing on load balancer 150. Similarly, monitoring agent 161A and monitoring agent 161B monitor various aspects of web server 160A and web server 160B, respectively, including ports, URLs, processes, applications, and/or virtualized computing instances that may be executing on each of web servers 160. Similarly, monitoring agent 171A, monitoring agent 171B, and monitoring agent 171C monitor various aspects of application server 170A, application server 170B, application server 170C, respectively, including ports, URLs, processes, applications, and/or virtualized computing instances that may be executing on each of application servers 170. Further, monitoring agent 181A and monitoring agent 181B monitor various aspects of database 180A and database 180B, respectively, including ports, URLs, processes, applications, and/or virtualized computing instances that may be executing on each of databases 180.

One or more monitoring agents may detect a status change and determine whether to send an alert based on the criticality of the nodes, components and/or devices undergoing the status change. For instance, in the example of FIG. 1A, monitoring agent 171C detects a change in the operation of application server 170C, which may include a system error, an error condition, a change in CPU, memory, or other resource utilization, or any other change. Monitoring agent 171C determines, based on the criticality information received from central monitoring system 110, the criticality or importance of the status change. In some examples, monitoring agent 171C may determine, based on the criticality or importance of the status change detected by monitoring agent 171C, that an alert should be sent to a network administrator to report the status change. In other examples, monitoring agent 171C may determine, based on the criticality or importance of the status change detected by monitoring agent 171C, that the status change is not sufficiently important or has such a small impact on the network that no alert should be sent to report on the status change. In either case, monitoring agent 171C may store or log information about the status change at application server 170C. Further, in either case, monitoring agent 171C may cause application server 170 to send information about the status change over network 105 to central monitoring system 110. Central monitoring system 110 may receive the information and store or all of the information about the status change in data store 111.

In examples in which monitoring agent 171C determines that an alert should be sent, monitoring agent 171C may send information to mobile device 108 about the status change. For instance, in such an example, monitoring agent 171C causes application server 170C to output a signal over network 105. One or more devices, such as mobile device 108, detects a signal over network 105. Mobile device 108 determines that the signal includes information sufficient to present a user interface. Mobile device 108 uses the information to present user interface 109 at a display device associated with mobile device 108. In the example shown in FIG. 1A, user interface 109 includes information about the status change detected by monitoring agent 171C at application server 170C.

Client device 130 may display a user interface that provides a hierarchical and/or dynamic view of the status of nodes and other components of one or more platforms 140. For instance, in the example of FIG. 1A, client device 130 may detect input that it determines corresponds to a user's or network administrator's request to display information. Client device 130 outputs a signal over network 105. Central monitoring system 110 detects a signal and determines that the signal corresponds to a request to display information about the status of one or more nodes, components, and/or computing devices within platform 140A. Central monitoring system 110 accesses information within data store 111. Central monitoring system 110 sends a response over network 105 that includes information derived from the accessed information in data store 111. Client device 130 detects a signal corresponding to the response and determines that the signal includes information sufficient to generate a user interface. Client device 130 generates user interface 131 and presents it at a display device associated with client device 130. User interface 131 may present a hierarchical view of platform 140A, including status indicators identifying the state of each of the nodes with in platform 140A. The information presented within user interface 131 may be current information, and may be near or seemingly-near real-time information.

The criticality of one or more nodes or computing devices may be adjusted when a new node or computing device has been added to one or more platforms 140. For instance, in the example of FIG. 1B, one or more monitoring agents included within platform 140A may detect that a new web server, such as web server 160C, has been added to platform 140A. In the example of FIG. 1B, monitoring agent 151 executing on load balancer 150 automatically detects that a new web server has been added to platform 140A. However, in other examples, monitoring agent 161A executing on web server 160A, monitoring agent 161B executing on web server 160B, or one or more other monitoring agents may automatically detect that a new web server has been added to platform 140A. Upon detecting that web server 160C has been added to platform 140A, monitoring agent 151 determines information about web server 160C, and outputs a signal over network 105. Central monitoring system 110 detects a signal over network 105 and determines that the signal includes information about web server 160C added to platform 140A. Central monitoring system 110 determines the criticality of web server 160C, based on information about system 100 stored in data store 111. Central monitoring system 110 updates data store 111 with information about the criticality of web server 160C. Central monitoring system 110 further determines any adjustments to the criticality of other devices, components, or applications of one or more platforms 140, and updates data store 111 to reflect such adjustments. For example, in the example of FIG. 1A, since web server 160C has been added to platform 140A, the criticality of web server 160A and web server 160B may be reduced, since web server 160C may perform operations that web server 160A and web server 160B were previously relied upon to perform. In the example of FIG. 1B, therefore, the criticality of web server 160A and web server 160B may be reduced from 50% to 33%, and the criticality of web server 160C may also be 33%.

In the example shown in FIG. 1B, each of web server 160A, web server 160B, and web server 160C are physical host devices, each including one or more monitoring agents executing thereon. In other examples, however, one or more of web server 160A, web server 160B, and web server 160C may be virtual computing instances (e.g., virtual machines or containers) that execute in a virtualized environment provided by a physical computing device. In such an example, only one monitoring agent might be executing on the physical computing device, and that monitoring agent may monitor each virtual computing instance executing on the physical computing device. In other examples, a monitoring agent might be deployed for each virtual machine within the physical computing device.

FIG. 1A and FIG. 1B illustrate at least one example implementation of system 100. Other example or alternate implementations of system 100 may be appropriate in other instances. Such implementations may include a subset of the devices and/or components included in the example(s) of FIG. 1A and FIG. 1B and/or may include additional devices and/or components not shown in FIG. 1A and FIG. 1B.

Accordingly, although one or more implementations of system 100 have been described with reference to FIG. 1A and FIG. 1B, system 100 may be implemented in a number of different ways.

For instance, one or more devices of system 100 that may be illustrated as separate devices may alternatively be implemented as a single device; one or more components of system 100 that may be illustrated as separate components may alternatively be implemented as a single component. Also, in some examples, one or more devices of system 100 that may be illustrated as a single device may alternatively be implemented as multiple devices; one or more components of system 100 that may be illustrated as a single component may alternatively be implemented as multiple components. Each of the multiple devices and/or components may be directly coupled via wired or wireless communication and/or remotely coupled via one or more networks. Also, one or more devices or components that may be illustrated in FIG. 1A and/or FIG. 1B may alternatively be implemented as part of another device or component not shown in FIG. 1A and/or FIG. 1B.

Further, certain operations, techniques, features, and/or functions may have been described herein as being performed by specific components, devices, and/or modules in FIG. 1A and/or FIG. 1B. In other examples, such operations, techniques, features, and/or functions may be performed by different components, devices, or modules. Accordingly, some operations, techniques, features, and/or functions that may have been described herein as being attributed to one or more components, devices, or modules in FIG. 1A and/or FIG. 1B may, in other examples, be attributed to other components, devices, and/or modules, even if not specifically described herein in such a manner.

By monitoring nodes independently in a distributed fashion using agents, system 100 may detect status changes earlier. By detecting status changes earlier, system 100 may more quickly deliver alerts about those status changes, and may do so in a near or seemingly near real-time manner. Therefore, aspects of this disclosure may improve the function of system 100 because monitoring nodes independently in a distributed fashion using agents may have the effect of enabling alerts about status changes to be delivered more quickly.

By monitoring nodes independently in a distributed fashion using agents, each of the agents may operate independently while still be centrally configurable. By operating independently while still being centrally configurable, agents may perform operations in parallel without unduly increasing the complexity of managing the agents. Therefore, aspects of this disclosure may improve the function of system 100 because monitoring nodes independently in a distributed fashion using agents may have the effect of enabling operations to be performed in parallel without undue complexity.

By determining the criticality of each node of a network, a more intelligent assessment of the impact of a status change on the network can be made. If impact assessments resulting from status changes are more intelligent, system 100 may operate in a more reliable and efficient manner, because system 100 is easier to maintain and manage if more intelligent information about impact assessments are available. Therefore, aspects of this disclosure may improve the function of system 100 because determining the criticality of each node of a network may have the effect of causing system 100 to operate more reliably and effectively.

By determining criticality of each node of a network, alerts sent by system 100 can be more effectively prioritized since status changes that are particularly important can be identified more easily. By more effectively prioritizing alerts sent by system 100, system 100 may perform less processing operations sending low priority alerts and thereby consume less electrical power and network bandwidth. Therefore, aspects of this disclosure may improve the function of system 100 because determining the criticality of each node of a network may have the effect of causing system 100 to consume less electrical power and consume less network bandwidth.

By dynamically adjusting the criticality some or all of the nodes in a network as a result of new nodes being added to the network, system 100 may automatically assimilate changes to the network. By automatically assimilating changes to the network, system 100 may operate more autonomously and reliably because less manual intervention may be required if system 100 automatically discovers and adjusts for new nodes being added. Therefore, aspects of this disclosure may improve the function of system 100 because dynamically adjusting the criticality of nodes as a result of a new node being added may have the effect of causing system 100 to operate more autonomously and reliably.

Figure 2:
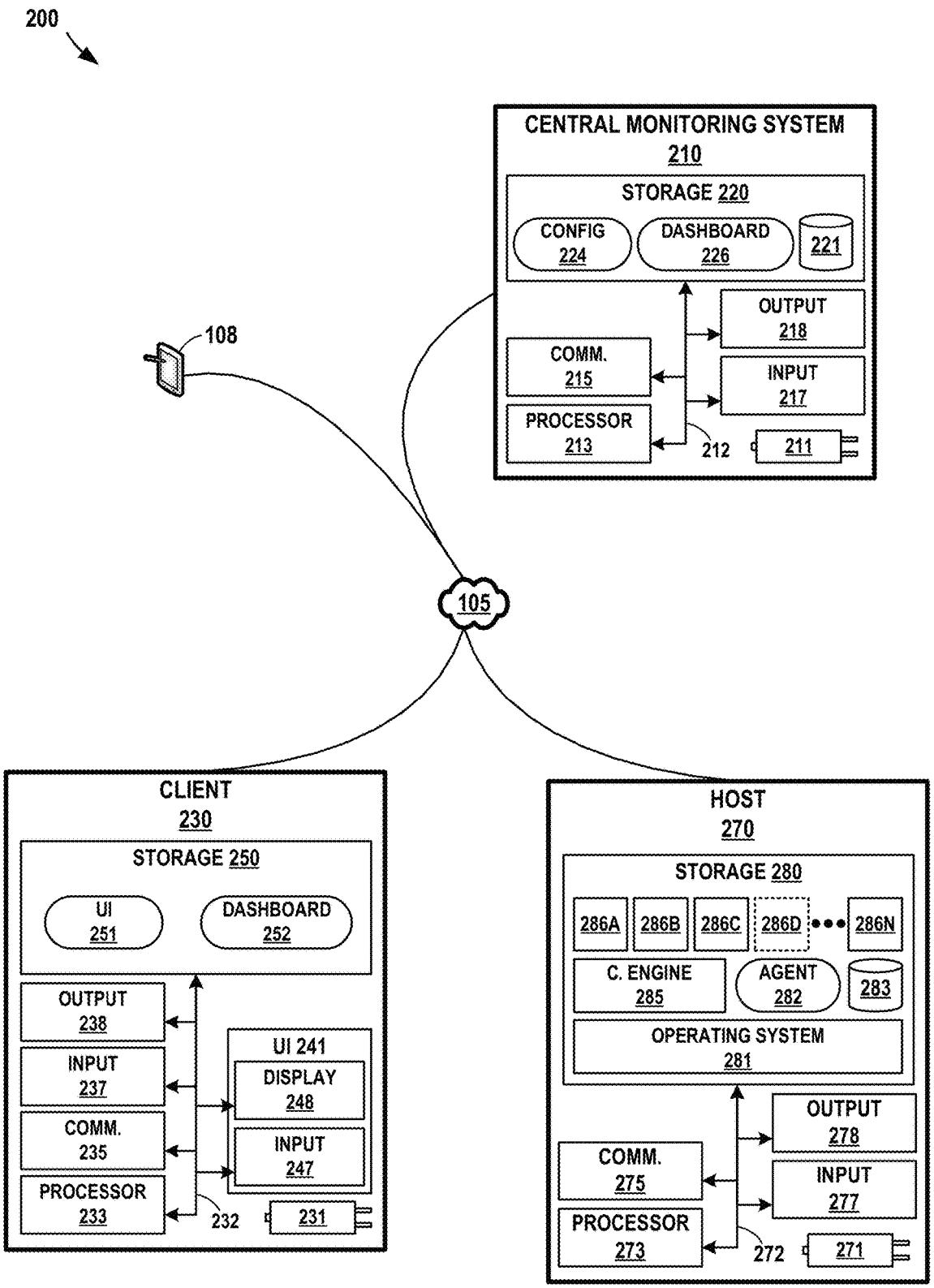
FIG. 2 is a block diagram illustrating an example system for monitoring one or more applications and/or nodes operating in a computing environment, in accordance with one or more aspects of the present disclosure.

FIG. 2 is a block diagram illustrating an example system for monitoring one or more applications and/or nodes operating in a computing environment, in accordance with one or more aspects of the present disclosure. System 200 of FIG. 2 may be described as an example or alternate implementation of system 100 of FIG. 1A and FIG. 1B. One or more aspects of FIG. 2 may be described herein within the context of FIG. 1A and FIG. 1B.

In the example of FIG. 2, system 200 includes network 105, central monitoring system 210, client device 230, host 270, and mobile device 108. In FIG. 2, mobile device 108 may correspond to mobile device 108 of FIG. 1A and FIG. 1B and network 105 may correspond to network 105 of FIG. 1A and FIG. 1B. Also, central monitoring system 210 may correspond to central monitoring system 110 of FIG. 1A and FIG. 1B, client device 230 may correspond to client device 130 of FIG. 1A and FIG. 1B, and host 270 may correspond to application server 170 of FIG. 1A and FIG. 1B. Each of these systems may be implemented in a manner consistent with the description provided in connection with FIG. 1A and FIG. 1B, although in some examples, such systems may involve alternate implementations with more, fewer, or different capabilities. For ease of illustration, only one central monitoring system 210, one client device 230, and one host 270 is illustrated in FIG. 2, although techniques in accordance with one or more aspects of this disclosure may be performed with many more of such systems.

Network 105 may be the internet, or may include or represent any public or private communications network or other network. For instance, network 105 may be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 105 using any suitable communication techniques. Network 105 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 2 may be operatively coupled to network 105 using one or more network links. The links coupling such devices or systems to network 105 may be Ethernet, Asynchronous Transfer Mode (ATM) or other types of network connections, and such connections may be wireless and/or wired connections. One or more of the devices or systems illustrated in FIG. 2 or otherwise on network 105 may be in a remote location relative to one or more other illustrated devices or systems.

Central monitoring system 210 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, central monitoring system 210 represents a cloud computing system, server farm, and/or server cluster (or portion thereof) that provides services to client devices and other devices or systems. In other examples, central monitoring system 210 may represent or be implemented through one or more virtualized compute instances (e.g., virtual machines, containers) of a cloud computing system, server farm, data center, and/or server cluster.

In the example of FIG. 2, central monitoring system 210 may include power source 211, one or more communication units 215, one or more input devices 217, one or more output devices 218, and one or more storage devices 220. Storage devices 220 include configuration module 224, dashboard module 226, and data store 221. One or more of the devices, modules, storage areas, or other components of central monitoring system 210 may be interconnected to enable inter-component communications (physically, communicatively, and/or operatively). In some examples, such connectivity may be provided by through communication channels (e.g., communication channels 212), a system bus, a network connection, an inter-process communication data structure, or any other method for communicating data.

Power source 211 may provide power to one or more components of central monitoring system 210. Power source 211 may receive power from the primary alternating current (AC) power supply in a building, home, or other location. In other examples, power source 211 may be a battery or a device that supplies direct current (DC). In still further examples, central monitoring system 210 and/or power source 211 may receive power from another source. One or more of the devices or components illustrated within central monitoring system 210 may be connected to power source 211, and/or may receive power from power source 211. Power source 211 may have intelligent power management or consumption capabilities, and such features may be controlled, accessed, or adjusted by one or more modules of central monitoring system 210 and/or by one or more processors 213 to intelligently consume, allocate, supply, or otherwise manage power.

One or more processors 213 of central monitoring system 210 may implement functionality and/or execute instructions associated with central monitoring system 210 or associated with one or more modules illustrated herein and/or described below. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Central monitoring system 210 may use one or more processors 213 to perform operations in accordance with one or more aspects of the present disclosure using software, hardware, firmware, or a mixture of hardware, software, and firmware residing in and/or executing at central monitoring system 210.

One or more communication units 215 of central monitoring system 210 may communicate with devices external to central monitoring system 210 by transmitting and/or receiving data, and may operate, in some respects, as both an input device and an output device. In some examples, communication unit 215 may communicate with other devices over a network. In other examples, communication units 215 may send and/or receive radio signals on a radio network such as a cellular radio network. In other examples, communication units 215 of central monitoring system 210 may transmit and/or receive satellite signals on a satellite network such as a Global Positioning System (GPS) network. Examples of communication units 215 include a network interface card (e.g. such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 217 may represent any input devices of central monitoring system 210 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of central monitoring system 210 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices 220 within central monitoring system 210 may store information for processing during operation of central monitoring system 210. Storage devices 220 may store program instructions and/or data associated with one or more of the modules described in accordance with one or more aspects of this disclosure. One or more processors 213 and one or more storage devices 220 may provide an operating environment or platform for such modules, which may be implemented as software, but may in some examples include any combination of hardware, firmware, and software. One or more processors 213 may execute instructions and one or more storage devices 220 may store instructions and/or data of one or more modules. The combination of processors 213 and storage devices 220 may retrieve, store, and/or execute the instructions and/or data of one or more applications, modules, or software.

Processors 213 and/or storage devices 220 may also be operably coupled to one or more other software and/or hardware components, including, but not limited to, one or more of the components of central monitoring system 210 and/or one or more devices or systems illustrated as being connected to central monitoring system 210.

In some examples, one or more storage devices 220 are temporary memories, meaning that a primary purpose of the one or more storage devices is not long-term storage. Storage devices 220 of central monitoring system 210 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 220, in some examples, also include one or more computer-readable storage media. Storage devices 220 may be configured to store larger amounts of information than volatile memory. Storage devices 220 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories.

Configuration module 224 may perform functions relating to configuring one or more monitoring agents and/or performing an impact analysis for changes in status to one or more nodes of system 200 or for new nodes added to a network. Configuration module 224 may determine the criticality of one or more nodes in a network. Configuration module 224 may maintain data store 221, and store within data store 221 information about the criticality of nodes within a network and/or a set of rules associated with nodes and/or types of nodes within a network. Configuration module 224 may determine whether any adjustments to the criticality of other nodes should be made, and if so, configuration module 224 may perform such adjustments by, for example, configuring or updating the configuration of agents executing on hosts within a network. Configuration module 224 may interact with and/or operate in conjunction with one or more modules of central monitoring system 210, including dashboard module 226.

Dashboard module 226 may perform functions relating to responding to request for information intended to be presented as a dashboard on a client device. For example, dashboard module 226 may receive a request to present a hierarchical view of the services associated with one or more services. In another example, dashboard module 226 may receive a request to present information about communications between two applications shown connected by one or more connection display elements or one or more connection display elements. Dashboard module 226 may respond to such requests by outputting information about one or more services, one or more application display elements, and/or one or more connection display elements. Dashboard module 226 may, in responding to such requests, access information stored within 221. Dashboard module 226 may interact with and/or operate in conjunction with one or more modules of central monitoring system 210, including configuration module 224.

Data store 221 may represent any suitable data structure or storage medium for storing information related to storing configuration information, criticality information, and or rules information relating to types of nodes. The information stored in data store 221 may be searchable and/or categorized such that one or more modules within central monitoring system 210 may provide an input requesting information from data store 221, and in response to the input, receive information stored within data store 221. Data store 221 may provide other modules with access to the data stored within data store 221, and/or may analyze the data stored within data store 221 and output such information on behalf of other modules of central monitoring system 210. Data store 221 may be primarily maintained by configuration module 224.

Client device 230 may be implemented as any suitable computing system, such as a mobile, non-mobile, wearable, and/or non-wearable computing device. Client device 230 may represent a smart phone, a tablet computer, a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, a laptop or notebook computer, a desktop computer, or any other type of wearable, non-wearable, mobile, or non-mobile computing device that may perform operations in accordance with one or more aspects of the present disclosure.

In the example of FIG. 2, client device 230 may include power source 231, one or more processors 233, one or more communication units 235, one or more input devices 237, one or more output devices 238, one or more user interface devices 241, and one or more storage devices 250. User interface device 241 includes input device 247 and display 248. Storage device 250 includes user interface module 251 and dashboard module 252. One or more of the devices, modules, storage areas, or other components of client device 230 may be interconnected to enable inter-component communications (physically, communicatively, and/or operatively). In some examples, such connectivity may be provided by through communication channels (e.g., communication channels 232), a system bus, a network connection, an inter-process communication data structure, or any other method for communicating data.

Power source 231 may provide power to one or more components of client device 230, and may be implemented in a manner similar to or consistent with other sources of power described herein.

One or more processors 233 of client device 230 may implement functionality and/or execute instructions associated with client device 230 or associated with one or more modules illustrated herein and/or described below and may be implemented in a manner similar to or consistent with the description of other processors or processing circuitry described herein.

One or more communication units 235 of client device 230 may communicate with devices external to client device 230 by transmitting and/or receiving data over a network or otherwise, and may be implemented in a manner similar to or consistent with the description of other communication units described herein.

User interface device 241 may function as an input and/or output device or set of input/output devices for client device 230, and may be implemented using various devices, components, and/or technologies. User interface device 241 may include presence-sensitive input panel technologies, microphone technologies, voice activation and/or recognition technologies, cameras, sensor technologies (e.g., infrared, image, location, motion, accelerometer, gyrometer, magnetometer), or other input device technology for use in receiving user input; user interface device 241 may include display devices, speaker technologies, haptic feedback technologies, tactile feedback technologies, light emitting technologies, or other output device technologies for use in outputting information to a user. In the example of FIG. 2, user interface device 241 includes one or more displays 248 and one or more input devices 247.

One or more displays 248 may generally refer to any appropriate type of display device, such as a display associated with any type of computing device, such as a tablet, mobile phone, watch, or any other type of wearable, non-wearable, mobile, or non-mobile computing device. Display 248 may function as one or more output (e.g., display) devices using technologies including liquid crystal displays (LCD), dot matrix displays, light emitting diode (LED) displays, organic light-emitting diode (OLED) displays, e-ink, or similar monochrome or color displays capable of generating tactile, audio, and/or visual output. Display 248 may include a cathode ray tube (CRT) monitor, liquid crystal display (LCD), Light-Emitting Diode (LED) display, or any other type of display device. Display 248 may output information to a user in the form of a user interface, which may be associated with functionality provided by client device 230. Such user interfaces may be associated with computing platforms, operating systems, applications, and/or services executing at or accessible from client device 230 (e.g., network monitoring and/or diagnostic dashboard, and other types of applications). For example, display 248 may present one or more user interfaces which are graphical user interfaces of an application executing at client device 230 including various graphical elements displayed at various locations of display 248.

One or more input devices 247 are components of user interface device 241 and may include a keyboard, pointing device, voice responsive system, video camera, button, sensor, mobile input device, control pad, microphone, presence-sensitive screen, network, or any other type of device for detecting input from a human.

One or more input devices 237 may represent any input devices of client device 230 not otherwise separately described herein, and may include any type of device for detecting input from a machine (e.g., through a USB, Firewire, or other interface). Input devices 237 may generate, receive, and/or process input, and may be implemented in a manner similar to or consistent with the description of other input devices described herein.

One or more output devices 238 may represent any output devices of client device 230 not otherwise separately described herein. Output devices 238 may generate, present, and/or process output. For example, one or more output devices 238 may generate, present, and/or process output in the form of tactile, audio, visual, and/or video output. Output devices 238 may include a sound card, video graphics adapter card, speaker, presence-sensitive screen, one or more USB interfaces, video and/or audio output interfaces, or any other type of device capable of generating tactile, audio, visual, video, or other output (e.g., a haptic response, a sound, a flash of light, and/or images). Some devices may serve as both input and output devices. For example, a communication device may both send and receive data to and from other systems or devices over a network. Also, a touch-sensitive or presence-sensitive display may both detect input in the form of physical taps or gestures, and present output in the form of visual information.

One or more storage devices 250 within client device 230 may store program instructions and/or data associated with one or more of the modules of client device 230 in accordance with one or more aspects of this disclosure. One or more processors 233 and one or more storage devices 250 may provide an operating environment or platform for such modules. Storage devices 250 may be implemented in a manner similar to or consistent with the description of other storage devices described herein.

User interface module 251 may manage user interactions with user interface device 241 and other components of client device 230. User interface module 251 may cause user interface device 241 to output various user interfaces for display or presentation or otherwise, as a user of client device 230 views, hears, or otherwise senses output and/or provides input at user interface device 241. User interface device 241 may detect input, and may output to user interface module 251 one or more indications of input as a user of client device 230 interacts with a user interface presented at user interface device 241. User interface module 251 and user interface device 241 may interpret inputs detected at user interface device 241 and may relay information about the inputs detected at user interface device 241 to one or more associated platforms, operating systems, applications, and/or services executing at client device 230 to cause client device 230 to perform one or more functions. User interface module 251 may receive information and instructions from a platform, operating system, application, and/or service executing at client device 230 and/or one or more remote computing systems. In addition, user interface module 251 may act as an intermediary between a platform, operating system, application, and/or service executing at client device 230 and various output devices of client device 230 (e.g., speakers, LED indicators, audio or electrostatic haptic output devices, light emitting technologies, displays, etc.) to produce output (e.g., a graphic, a flash of light, a sound, a haptic response, etc.).

Dashboard module 252 may perform functions relating to presenting information about nodes and/or applications, services, and/or processes executing within a datacenter, cluster, stack, platform, or network. Dashboard module 252 may receive, over network 105, information that it uses to generate user interface data for presentation by a user interface device. Dashboard module 252 may cause user interface module 251 to present a user interface at user interface device 241 using the user interface data. Dashboard module 252 may receive information about input that it determines corresponds to an interaction, by a user, with a user interface presented by user interface device 241. Dashboard module 252 may, in response, update one or more user interfaces to present further or different information.

Host 270 represents a physical computing device or compute node that provides an execution environment for virtual hosts, virtual machines, containers, and/or other virtualized computing resources. In some examples, host 270 may be a component of a cloud computing system, server farm, and/or server cluster (or portion thereof) that provides services to client devices and other devices or systems. Although primarily described herein as a physical computing device, host 270 may, in other examples, itself be implemented as a virtualized computing device (e.g., as a virtual machine or container).

In the example of FIG. 2, host 270 includes underlying physical compute hardware that includes power source 271, one or more processors 273, one or more communication units 275, one or more input devices 277, one or more output devices 278, and one or more storage devices 280. One or more of the devices, modules, storage areas, or other components of host 270 may be interconnected to enable inter-component communications (physically, communicatively, and/or operatively). In some examples, such connectivity may be provided by through communication channels (e.g., communication channel 272), a system bus, a network connection, an inter-process communication data structure, or any other method for communicating data.

Power source 271 may provide power to one or more components of host 270, and may be implemented in a manner similar to or consistent with other sources of power described herein.

One or more processors 273 of host 270 may implement functionality and/or execute instructions associated with host 270 or associated with one or more modules illustrated herein and/or described below and may be implemented in a manner similar to or consistent with the description of other processors or processing circuitry described herein.

One or more communication units 275 of host 270 may communicate with devices external to host 270 by transmitting and/or receiving data over a network or otherwise, and may be implemented in a manner similar to or consistent with the description of other communication units described herein.

One or more input devices 277 may represent any input devices of host 270 not otherwise separately described herein. Input devices 277 may generate, receive, and/or process input, and may be implemented in a manner similar to or consistent with the description of other input devices described herein.

One or more output devices 278 may represent any output devices of host 270 not otherwise separately described herein. Output devices 278 may generate, present, and/or process output, and may be implemented in a manner similar to or consistent with the description of other output devices described herein.

One or more storage devices 280 within host 270 may store program instructions and/or data associated with one or more of the modules of host 270 in accordance with one or more aspects of this disclosure. One or more processors 273 and one or more storage devices 280 may provide an operating environment or platform for such modules. Storage devices 280 may be implemented in a manner similar to or consistent with the description of other storage devices described herein.

Operating system 281 is a software and/or firmware layer that supports or provides access to a computing device's functions, such as scheduling tasks, execution tasks, and component and/or peripheral control. Operating system 281 may execute within the execution environment provided by storage devices 280 and processors 273. Operating system 281 may provide an operating environment, services, and control for one or more modules executing on host 270.

Container engine 285 may serve as a management and orchestration system for containers 286 that execute within the operating environment provided by operating system 281 and/or the combination of storage devices 280 and processors 273. In some examples, container engine 285 may perform various organizational and maintenance tasks, including organizing one or more containers 286 into logical groups of related containers. Although normally a software module that executes on top of operating systems 281, container engine 285 may, in some examples, be integrated into operating system 281 and may be implemented at least partially through firmware.

One or more containers 286 may represent a stand-alone, executable package of computing instructions. In some examples, each of containers 286 include code, runtime objects, system tools, system libraries, and/or settings needed to properly execute. In other examples, some components (e.g., runtime objects, libraries) may be provided by container engine 285 and/or operating system 281. Further, in some examples, each of containers 286 may be isolated from other containers 286 executing on host 270. Like a virtual machine, each of containers 286 is virtualized and may remain isolated from the host machine and other containers. However, unlike a virtual machine, each container may omit an individual operating system and provide only an application suite and application-specific libraries. Each of containers 286 may be executed by host 270 as an isolated user-space instance and may share an operating system and common libraries with other containers executing on the host machine. As used herein, containers 286 may also be referred to as virtualization engines, virtual private servers, silos, or jails. In some examples, the techniques described herein with respect to containers may be applied to virtual machines or other virtualization components. In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems.

Monitoring agent 282 may perform functions relating to monitoring one or more nodes on a network, determining the criticality of a status change to such nodes, and generating alerts in response to such status changes. Monitoring agent 282 may receive, from central monitoring system 210 or elsewhere, configuration information about how to monitor one or more nodes, information about how and when to send alerts about status changes, and/or information about the criticality of one or more nodes included within a network and/or executing on host 270. Monitoring agent 282 may store and maintain information in data store 283. Monitoring agent 282 may detect status changes associated with nodes, including ports, URLs, processes, containers, virtual machines, network components, or other aspects of system 200. Monitoring agent 282 may determine an impact resulting from a status change, including the impact on one or more nodes within system 200, including containers 286, host 270, applications executing on host 270, and/or other devices. Monitoring agent 282 may determine that the severity and/or impact of the status change might require intervention by a network administrator, and may, in some examples, send an alert to a network administrator including information about the status change. Monitoring agent 282 may interact with and/or operate in conjunction with one or more modules of host 270. Although monitoring agent 282 may be described in connection with FIG. 2 as primarily executing as an application or operating system service, monitoring agent 282 may alternatively operate in other ways, such as within the operating system or kernel, within container engine 285, or within a virtual machine executing on host 270.

Data store 283 may represent any suitable data structure or storage medium for storing information related to storing configuration information, criticality information, and or rules information relating to types of nodes. The information stored within data store 283 may be sufficient, in some or all cases, to determine the criticality of a status change taking place at host 270. The information stored in data store 283 may be searchable and/or categorized such that one or more modules within host 270 may provide an input requesting information from data store 283, and in response to the input, receive information stored within data store 283. Data store 283 may provide other modules with access to the data stored within data store 283, and/or may analyze the data stored within data store 283 and output such information on behalf of other modules of host 270. Data store 283 may be primarily maintained by monitoring agent 282.

In the example of FIG. 2, and in accordance with one or more aspects of the present disclosure, host 270 may be remotely configured by central monitoring system 210. For instance, in the example of FIG. 2, configuration module 224 of central monitoring system 210 causes communication unit 215 to output a signal over network 105. Communication unit 275 of host 270 detects a signal over network 105 and outputs to monitoring agent 282 information about the signal. Monitoring agent 282 determines that the signal corresponds to configuration information about how to monitor host 270 and nodes included within host 270. Monitoring agent 282 may further determine that the signal includes information about how and when to send alerts about nodes included within of host 270. Monitoring agent 282 may also determine that the signal includes information about the criticality of one or more nodes within host 270 (e.g., criticality of one or more containers 286 executing in the environment provided by container engine 285). Monitoring agent 282 may determine that the signal includes rules associated with each process, application, container, virtual machine, node, or other aspect of host 270. Monitoring agent 282 may use such rules to determine the criticality of one or more containers 286 or any future containers 286 that may be instantiated or created. Monitoring agent 282 may store some or all of the configuration information in data store 283.

Monitoring agent 282 executing on host 270 may monitor aspects of host 270. For instance, in the example of FIG. 2, monitoring agent 282 monitors one or more of the nodes within host 270 (e.g., ports, URLs, processes, containers, virtual machines, network activity, and other aspects of host 270). Monitoring agent 282 may detect status changes associated with ports, URLs, processes, containers, virtual machines, network connectivity, or other aspects of host 270. Monitoring agent 282 may log status changes, error conditions, and/or other information collected or determined while monitoring aspects of host 270. Monitoring agent 282 may store, in data store 283, information derived from monitoring operations of host 270.

Monitoring agent 282 may determine the impact of a status change detected at host 270. For instance, in the example of FIG. 2, monitoring agent 282 determines that container 286C has stopped operating correctly, is no longer operable, and/or has undergone some other status change. Monitoring agent 282 accesses information stored in data store 283 and performs an impact analysis of the status change associated with container 286C. Monitoring agent 282 determines the impact of the status change, including the impact on container 286C itself, on host 270, on applications executing on host 270 and/or other devices, and on other nodes in the network hierarchy or within any platform associated with host 270.

Monitoring agent 282 may, in some examples, send an alert in response to detecting a status change. Monitoring agent 282 may, based on the impact analysis performed, determine that an alert should be sent to one or more devices monitored by network administrators. In some examples, monitoring agent 282 makes such a determination if the severity and/or impact of the status change might require intervention by a network administrator. In such an example, monitoring agent 282 causes communication unit 275 to output a signal over network 105. Mobile device 108 detects a signal over network 105 and determines that the signal includes information sufficient to generate user interface data for presentation by a user interface device. Mobile device 108 generates the user interface data and presents a corresponding user interface at a display device associated with mobile device 108.

In other examples, monitoring agent 282 might not send an alert in response to detecting a status change. Monitoring agent 282 may, based on the impact analysis, determine that an alert need not be sent to one or more devices monitored by network administrators. In some examples, monitoring agent 282 makes such a determination if the severity and/or impact of the status change does not require immediate intervention by a network administrator.

Monitoring agent 282 may detect and/or identify a new node. For instance, in the example of FIG. 2, monitoring agent 282 detects that a new container, such as container 286D, has been instantiated or spun up on host 270. Monitoring agent 282 causes communication unit 275 to output a signal over network 105. Communication unit 215 of central monitoring system 210 detects a signal over network 105. Communication unit 215 outputs information about the signal to configuration module 224. Configuration module 224 determines that the signal includes information about container 286D now executing on host 270. Configuration module 224 analyzes a set of default or customized rules or templates for rules to classify container 286D. In some examples, a set of rules are predefined for one or more nodes (e.g., Tomcat, Apache web server), so that configuration module 224 is able to determine if the new node (e.g., container 286D) can be classified according to one or more of the predefine nodes rule sets.

When adding a new node, monitoring agent 282 may apply one or more templates, such as a set of default Discovery Templates (Tomcat Template, HTTPD Template, F5 Template etc.), which include of predefined rules that monitoring agent 282 uses to classify the newly discovered service/node. In some examples, the newly discovered service/node might need to satisfy the set of rules included in one or more Discovery Templates to be classified according to that template. Existing templates can be customized, and new custom Discovery Templates can be created and/or added the system as per user requirements. Such templates may be stored in data store 283, or in some examples, data store 221.

In some examples, the node/service discovered will be acknowledged as per the set of rules defined in Discovery Template. For example, if monitoring agent 282 determines that a new node/service satisfies all the rules for a Tomcat in Discovery Template, then it will be acknowledged as a Tomcat node/service and the further step of placing that node/service in Hierarchy Diagram will begin. In some examples, the discovered node/service has to satisfy all of the rules mentioned in any of the templates of Discovery Template bucket to be added in the Hierarchy diagram.

Monitoring agent 282 may apply one or more default Mapping Templates (HTTPD-Tomcat Template, F5-HTTPD Template, HTTPD-JBoss template etc.) which include rules for how to place the discovered node/service in a Hierarchy diagram. A Mapping Template can also be customized as per user requirements. A newly discovered service/node will run through the set of rules of Mapping Template and, if appropriate, it will be placed in Hierarchy Diagram. For example, if the node/service discovered is Tomcat and the Mapping is HTTPD—Tomcat then for instance, if the Load Balancing technology used between Tomcat and Apache HTTPD is Mod Cluster then as per the rule mentioned in Mapping Template the agent 282 will go through Server.xml of Tomcat and look for Mod Cluster listener entry and from that entry will get the host name and/or IP address of the parent apache HTTPD node. Agent 282 may then appropriately map the new service/node in a Hierarchy diagram.

As per the node/service discovered by Discovery Template along with the mapping of the node/service by agents as per Mapping Template the criticality of that particular node/service is also configured and assigned to it, so that as per the criticality the new node/service can be handled in case of any outage. For example, in the default rules of some Mapping Templates, any service/node of a Database might be assigned a value of "1" and the criticality of any Tomcat node/service might then be 1 divided by "n," where n is the number of Tomcat services in that layer. When a new Tomcat service is added, the criticality of that new service will be 1/(n+1) where n>=1 (n is the number of Tomcat services in that layer). The criticality data is collected and used not only for deciding the significance of that particular node/service but also for feeding that data in the Intelligent Impact Analyzer algorithm of agent 282 and/or system 210.

Similarly, when any new application is to be added to the existing system, agents 282 may perform a number of steps pursuant to perform auto-discovery and place the new application within a Hierarchy diagram. For instance, when a new application is to be added agents 282 may, in some examples, be manually run through some or all of the devices, hosts, or machines within system 200. Agents 282 may assist in selecting the machines associated with new applications by displaying all machines on a user-configurable user interface. The user may, in some examples, select machines from UI which are associated with that application.

Once the machines have been grouped in their categories, monitoring agent 282 may apply one or more templates, such a set of default Discovery Templates (Tomcat Template, HTTPD Template, F5 Template etc.), which include of predefined rules that monitoring agent 282 uses to classify the newly discovered service/node. In some examples, the newly discovered service/node might need to satisfy the set of rules included in one or more Discovery Templates to be classified according to that template. Existing templates can be customized, and new custom Discovery Templates can be created and/or added the system as per user requirements. Such templates may be stored in data store 283, or in some examples, data store 221.

In some examples, the node/service discovered will be acknowledged as per the set of rules defined in Discovery Template. For example, if monitoring agent 282 determines that a new node/service satisfies all the rules for a Tomcat in Discovery Template, then it will be acknowledged as a Tomcat node/service and the further step of placing that node/service in Hierarchy Diagram will begin. In some examples, the discovered node/service has to satisfy all of the rules mentioned in any of the templates of Discovery Template bucket to be added in the Hierarchy diagram.

Monitoring agent 282 may apply one or more default Mapping Templates (HTTPD-Tomcat Template, F5-HTTPD Template, HTTPD-JBoss template etc.) which include rules for how to place the discovered node/service in a Hierarchy diagram. A Mapping Template can also be customized as per user requirements. A newly discovered service/node will run through the set of rules of Mapping Template and, if appropriate, it will be placed in Hierarchy Diagram. For example, if the node/service discovered is Tomcat and the Mapping is HTTPD—Tomcat then for instance, if the Load Balancing technology used between Tomcat and Apache HTTPD is Mod Cluster then as per the rule mentioned in Mapping Template the agent 282 will go through Server.xml of Tomcat and look for Mod Cluster listener entry and from that entry will get the host name and/or IP address of the parent apache HTTPD node. Agent 282 may then appropriately map the new service/node in a Hierarchy diagram.

As per the node/service discovered by Discovery Template along with the mapping of the node/service by agents as per Mapping Template the criticality of that particular node/service is also configured and assigned to it, so that as per the criticality the new node/service can be handled in case of any outage. For example, in the default rules of some Mapping Templates, any service/node of a Database might be assigned a value of "1" and the criticality of any Tomcat node/service might then be 1 divided by "n," where n is the number of Tomcat services in that layer. When a new Tomcat service is added, the criticality of that new service will be 1/(n+1) where n>=1 (n is the number of Tomcat services in that layer). The criticality data is collected and used not only for deciding the significance of that particular node/service but also for feeding that data in the Intelligent Impact Analyzer algorithm of agent 282 and/or system 210.

Configuration module 224 may determine the criticality of container 286D and update the criticality of related nodes. For instance, in the example of FIG. 2, configuration module 224 determines a place for container 286D in a hierarchy, and determines the criticality of container 286D. Configuration module 224 determines whether any adjustments to the criticality of other nodes should be made, and if so, performs such adjustments. Configuration module 224 updates data store 221 to take account any changes caused by the addition of container 286D at host 270.

Configuration module 224 may update the configuration of monitoring agent 282. For instance, in the example of FIG. 2, configuration module 224 causes communication unit 215 to output a signal over network 105. Communication unit 275 of host 270 detects a signal and outputs to monitoring agent 282 information about the signal. Monitoring agent 282 determines that the signal includes updated information about the criticality of one or more nodes, applications, processes, ports, URLs, or other nodes being monitored by monitoring agent 282. Monitoring agent 282 updates data store 283 with some or all of the information received from central monitoring system 210.

In examples described in connection with FIG. 2, monitoring agent 282 is described as determining the criticality of a status change associated with host 270 or nodes or components of host 270. In other examples, monitoring agent 282 may determine the criticality of such a status change by communicating with central monitoring system 210. Similarly, in the examples described in connection with FIG. 2, central monitoring system 210 is described as adjusting the criticality of aspects of nodes or components of host 270 when container 286D is instantiated or spun up on host 270, based on information received from monitoring agent 282 of host 270. In other examples, monitoring agent 282 may determine adjustments to the criticality of aspects of nodes or components of host 270 when container 286D is spun up on host 270.

Modules illustrated in FIG. 2 (e.g., navigation module 122, communication module 124, analysis module 126, user interface module 151, recovery module 152, and transaction module 154) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

FIG. 2 illustrates one example implementation of system 200. Other example or alternate implementations of system 200 may be appropriate in other instances. Such implementations may include a subset of the devices and/or components included in the example of FIG. 2 and/or may include additional devices and/or components not shown in FIG. 2. Accordingly, although one or more implementations of system 200 have been described with reference to FIG. 2, system 200 may be implemented in a number of different ways.

For instance, one or more devices of system 200 that are illustrated as separate devices may be implemented as a single device; one or more components of system 200 that are illustrated as separate components may be implemented as a single component. Also, in some examples, one or more devices of system 200 that are illustrated as a single device may be implemented as multiple devices; one or more components of system 200 that are illustrated as a single component may be implemented as multiple components. Each of the multiple devices and/or components may be directly coupled via wired or wireless communication and/or remotely coupled via one or more networks. Also, one or more devices or components illustrated in FIG. 2 may also be implemented as part of another device or component not shown in FIG. 2. In this and other ways, some of the functions described herein may be performed via distributed processing by two or more devices.

Further, certain operations, techniques, features, and/or functions have been described herein as being performed by specific components, devices, and/or modules in FIG. 2. In other examples, such operations, techniques, features, and/or functions may be performed by different components, devices, or modules. Accordingly, some operations, techniques, features, and/or functions described herein as being attributed to one or more components, devices, or modules in FIG. 2 may, in other examples, be attributed to other components, devices, and/or modules, even if not specifically described herein in such a manner.

Figure 3:
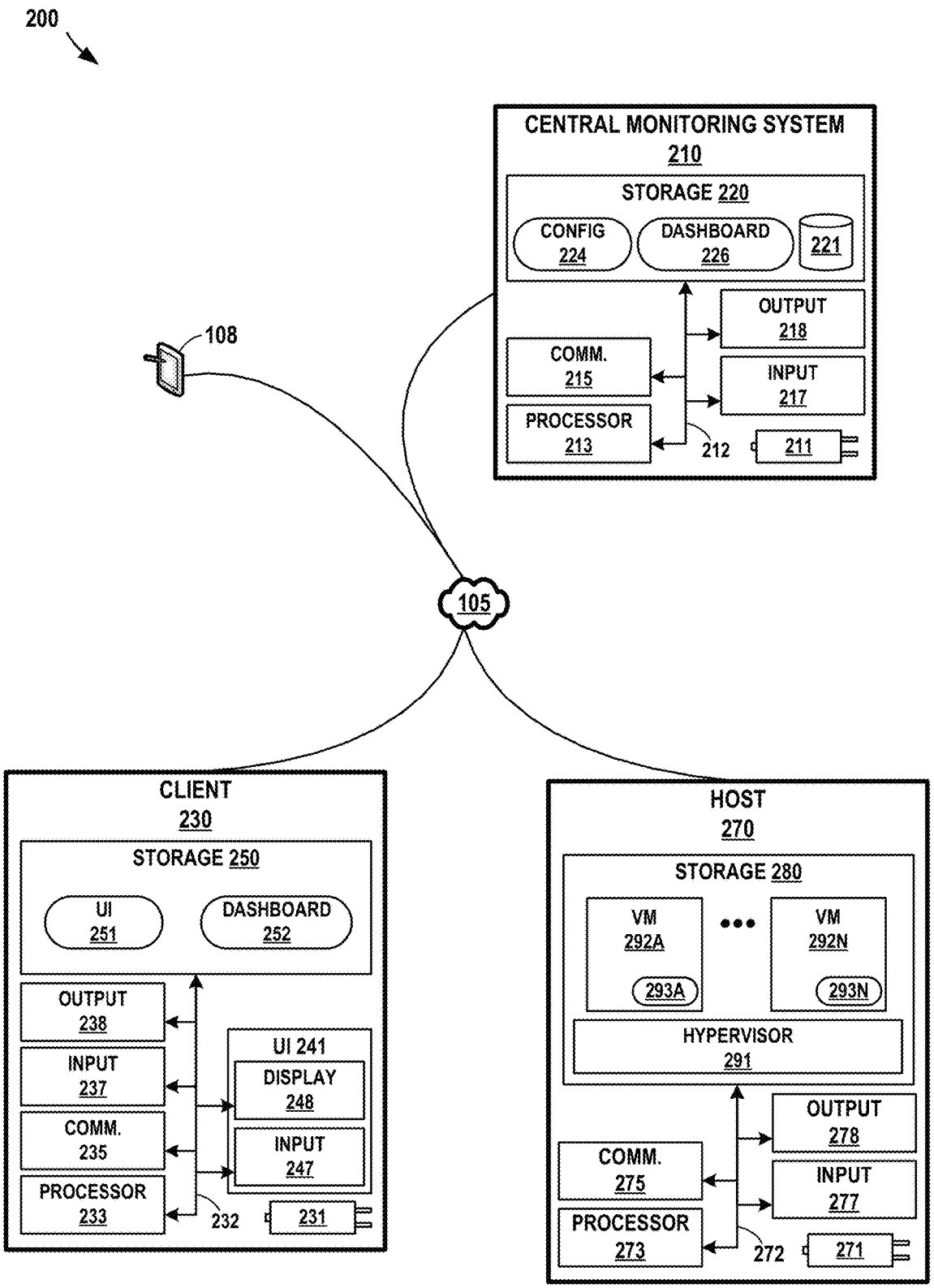
FIG. 3 is a block diagram illustrating another example system for monitoring one or more applications and/or nodes operating in a computing environment, in accordance with one or more aspects of the present disclosure.

FIG. 3 is a block diagram illustrating another example system for monitoring one or more applications and/or nodes operating in a computing environment, in accordance with one or more aspects of the present disclosure. FIG. 3 is similar to FIG. 2, but in FIG. 3, host 270 is configured to execute virtual machines, rather than containers 286 as illustrated in FIG. 2. In the example of FIG. 3, host 270 includes hypervisor 291 and a plurality of virtual machines, including virtual machine 292A through virtual machine 292N ("virtual machines 292"). Further, in the example of FIG. 3, one or more monitoring agents 293 executes within each of virtual machines 292. For example, monitoring agent 293A executes within virtual machine 292A and monitors nodes within or executing within virtual machine 292A. And in general, for an arbitrary number of virtual machines including virtual machine 292N, monitoring agent 293N executes within virtual machine 292N and monitors nodes within or executing within virtual machine 292N.

In some examples, hypervisor 291 is an operating system-level component that executes on a hardware platform (e.g., host 270) to provide a virtualized operating environment and orchestration controller for virtual machines, and/or other types of virtual computing instances. Hypervisor 291 may instantiate, create, and/or execute virtual machines on an underlying host hardware device. In some examples, hypervisor 291 may incorporate the functionality of kernel (e.g., as a "type 1 hypervisor"). In other examples, hypervisor 210 may execute on a kernel (e.g., as a "type 2 hypervisor"). Accordingly, hypervisor 291 may execute within the execution environment provided by storage devices 280 and processors 273 and/or within an operating system kernel. In some situations, hypervisor 210 may be referred to as a virtual machine manager (VMM).

In the example of FIG. 3, and in accordance with one or more aspects of the present disclosure, monitoring agent 293A may monitor nodes within virtual machine 292A. For instance, in the example of FIG. 3, monitoring agent 293A monitors one or more applications executing within virtual machine 292A. Monitoring agent 293A detects status changes associated with such applications, such as, for example, an application not operating properly. Monitoring agent 293A logs status changes, error conditions, and/or other information collected or determined while monitoring applications executing within virtual machine 292A.

Monitoring agent 293A may determine the impact of a status change detected within virtual machine 292A and send an alert. For instance, in the example of FIG. 3, monitoring agent 293A determines that an application executing within virtual machine 292A is not operating properly. Monitoring agent 293A performs an impact analysis of the status change. Monitoring agent 293A may, based on the impact analysis, determine that an alert should be sent to one or more devices monitored by network administrators. Monitoring agent 293A causes communication unit 275 to output a signal over network 105. Mobile device 108 detects a signal over network 105 and determines that the signal includes information sufficient to generate user interface data for presentation by a user interface device. Mobile device 108 generates the user interface data and presents a corresponding user interface at a display device associated with mobile device 108.

Figure 4A:
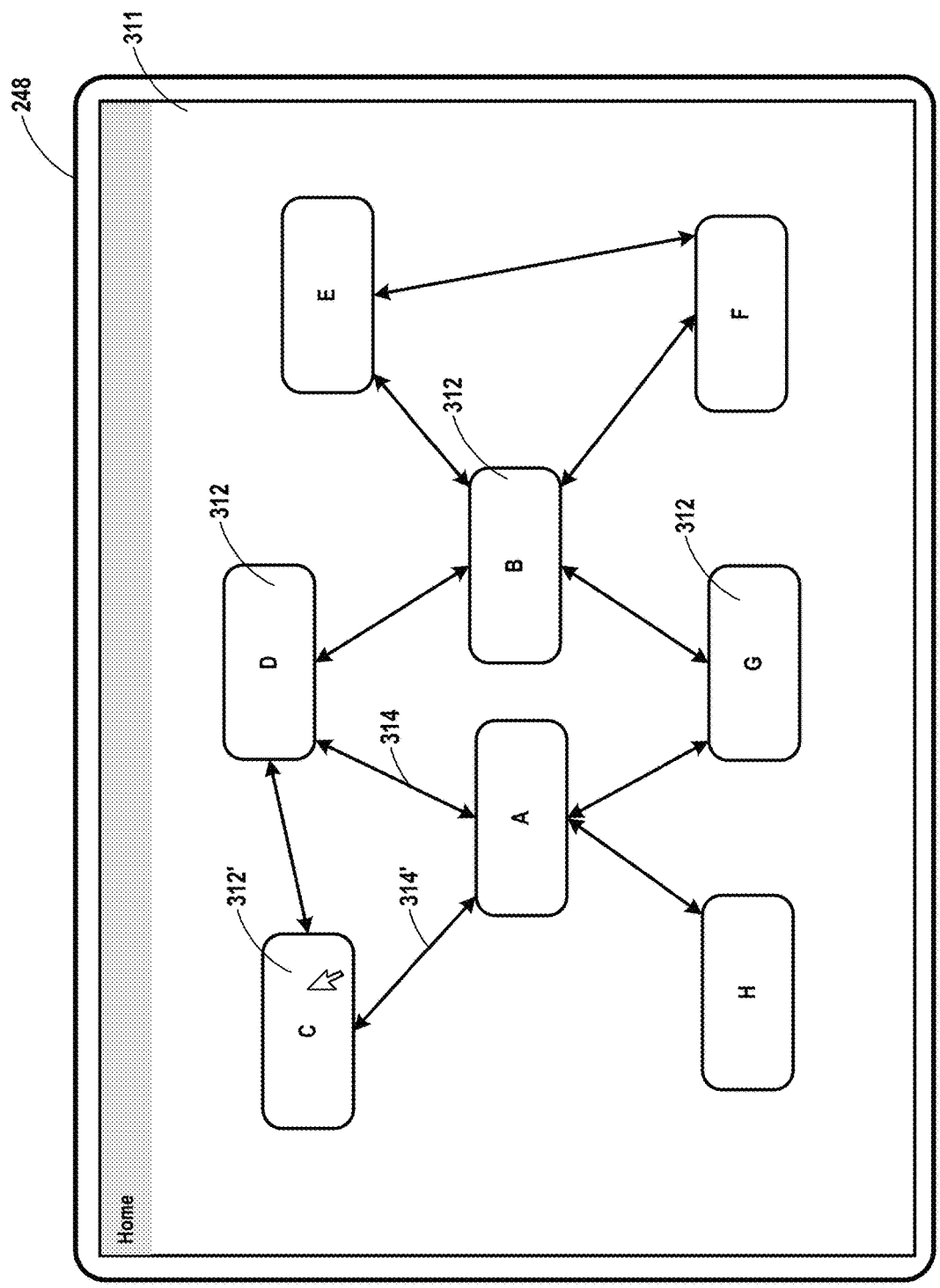
FIG. 4A through FIG. 4F are conceptual diagrams illustrating example user interfaces presented by an example client device in accordance with one or more aspects of the present disclosure.
Figure 4B:
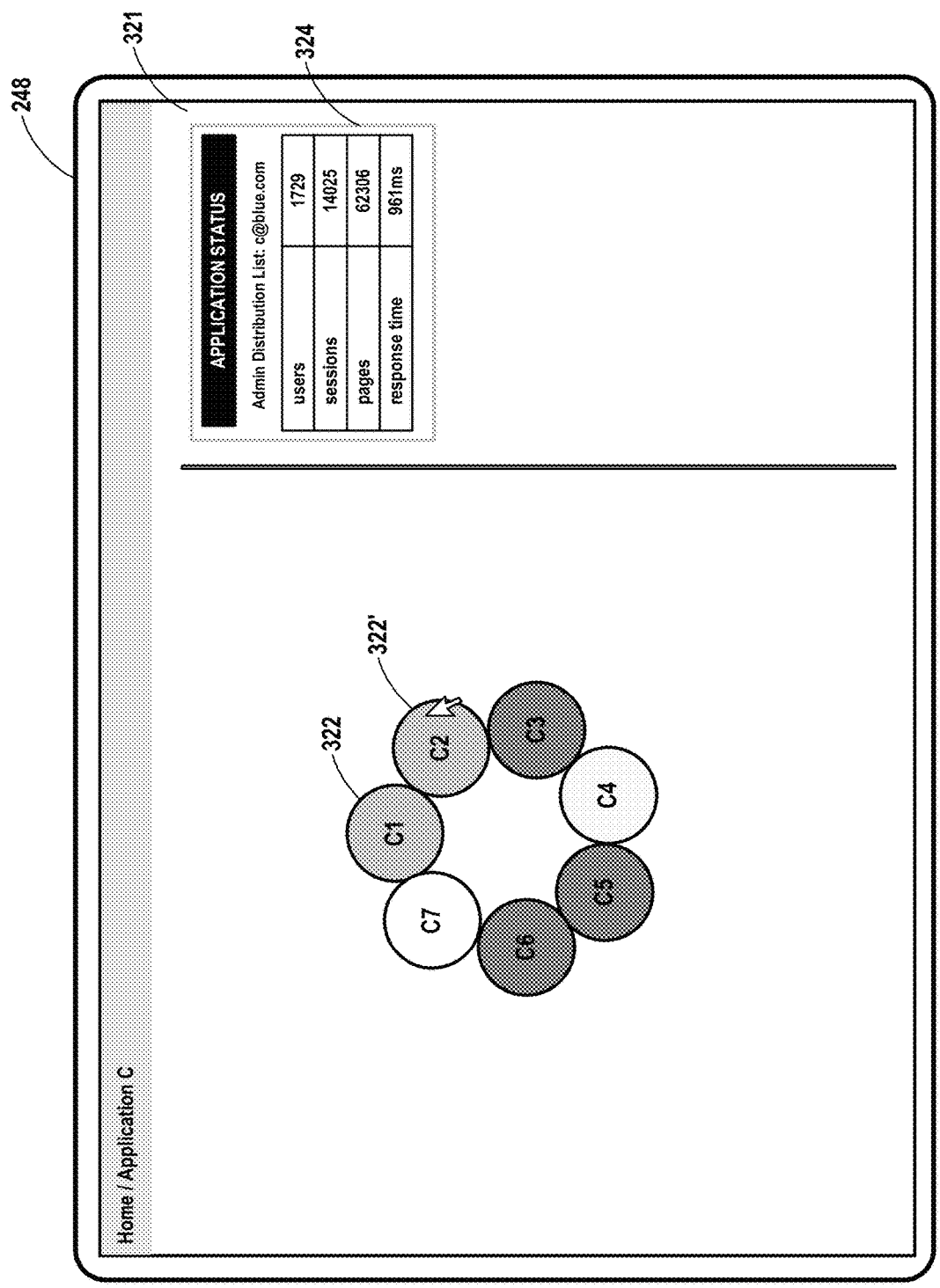

FIG. 4A through FIG. 4F are conceptual diagrams illustrating example user interfaces presented by an example client device in accordance with one or more aspects of the present disclosure. User interfaces illustrated in FIG. 4A through FIG. 4F may correspond to a user interface presented by client device 230 of FIG. 2 and FIG. 3. One or more aspects of the user interfaces illustrated in FIG. 4A and FIG. 4B may be described herein within the context of system 100 of FIG. 1 and/or FIG. 2. Although the user interfaces illustrated in FIG. 4A and FIG. 4B are shown as graphical user interfaces, other types of interfaces may be presented by client device 230, including a text-based user interface, a console or command-based user interface, a voice prompt user interface, or any other appropriate user interface now known or hereinafter developed.

FIG. 4A is an example user interface illustrating interactions between various applications in an enterprise network, in accordance with one or more aspects of the present disclosure. User interface 311 of FIG. 4A may be presented at a display device associated with client device 230 of FIG. 2. For instance, with reference to FIG. 2, input device 247 detects input and outputs to user interface module 251 an indication of input. User interface module 251 outputs information about the input to dashboard module 252. Dashboard module 252 determines that the input corresponds to a request to present information about nodes and/or applications executing within a datacenter, cluster, or other network. Dashboard module 252 causes communication unit 235 to output a signal over network 105. Communication unit 215 of central monitoring system 210 detects a signal and outputs to dashboard module 226 information about the signal. Dashboard module 226 determines that the signal corresponds to a request to present a dashboard view of applications executing within the network associated with host 270. Dashboard module 226 causes communication unit 215 to output a signal over network 105. Communication unit 235 of client device 230 detects a signal and outputs to dashboard module 252 information about the signal. Dashboard module 252 determines that the signal includes information sufficient to generate user interface data for presentation by a user interface device. Dashboard module 252 generates the user interface data and causes user interface module 251 to present user interface 311 at display 248, as illustrated in FIG. 4A.

In FIG. 4A, user interface 311 includes various application display elements 312, each representing an application or set of applications executing on an enterprise network. Status indicators associated with each application may be provided by an icon, color, colored outline, or other suitable indicator. For example, applications that are fully available may be colored, highlighted, or outlined with green. Those that are partially available may be outlined with yellow. Those that are unavailable or inoperable may be outlined with red. Further, those applications that are in standby mode, in maintenance mode, or those applications not yet brought online might be represented, colored, highlighted, or illustrated with one or more other colors. Connection display elements 314 represent communications between various applications, and may also be illustrated with colors indicating the status of the underlying connection.

FIG. 4B is an example user interface illustrating services provided by an application represented in FIG. 4A, in accordance with one or more aspects of the present disclosure. User interface 321 of FIG. 4B may be presented at a display device associated with client device 230 of FIG. 2. For instance, referring again to FIG. 2 and FIG. 4A, input device 247 detects input that dashboard module 252 determines corresponds to selection of application display element 312' within user interface 311. Dashboard module 252 causes communication unit 235 to output a signal over network 105. Communication unit 215 of central monitoring system 210 detects a signal that dashboard module 226 determines corresponds to a request to present further information about the application represented by application display element 312'. Dashboard module 226 causes communication unit 215 to output a signal over network 105.

Communication unit 235 of client device 230 detects a signal that dashboard module 252 determines includes information sufficient to generate user interface data for presentation by a user interface device. Dashboard module 252 generates the user interface data and causes user interface module 251 to present user interface 321 at display 248, as illustrated in FIG. 4B.

In FIG. 4B, user interface 321 illustrates various services 322 associated with the application represented by application display element 312'. Each of services 322 may include one or more status indicators, which may include an icon, color, or other suitable indicator. For example, services that are fully available may be colored, highlighted or outlined with green, those that are partially available may be outlined with yellow, those that are unavailable or inoperable may be outlined with red. Services that are in standby mode, in maintenance mode, or not yet brought online might be represented, colored, highlighted, or outlines with one or more other colors. In the example of FIG. 4B, information about the status of the application corresponding to application display element 312' is presented in application status region 324.

Figure 4C:
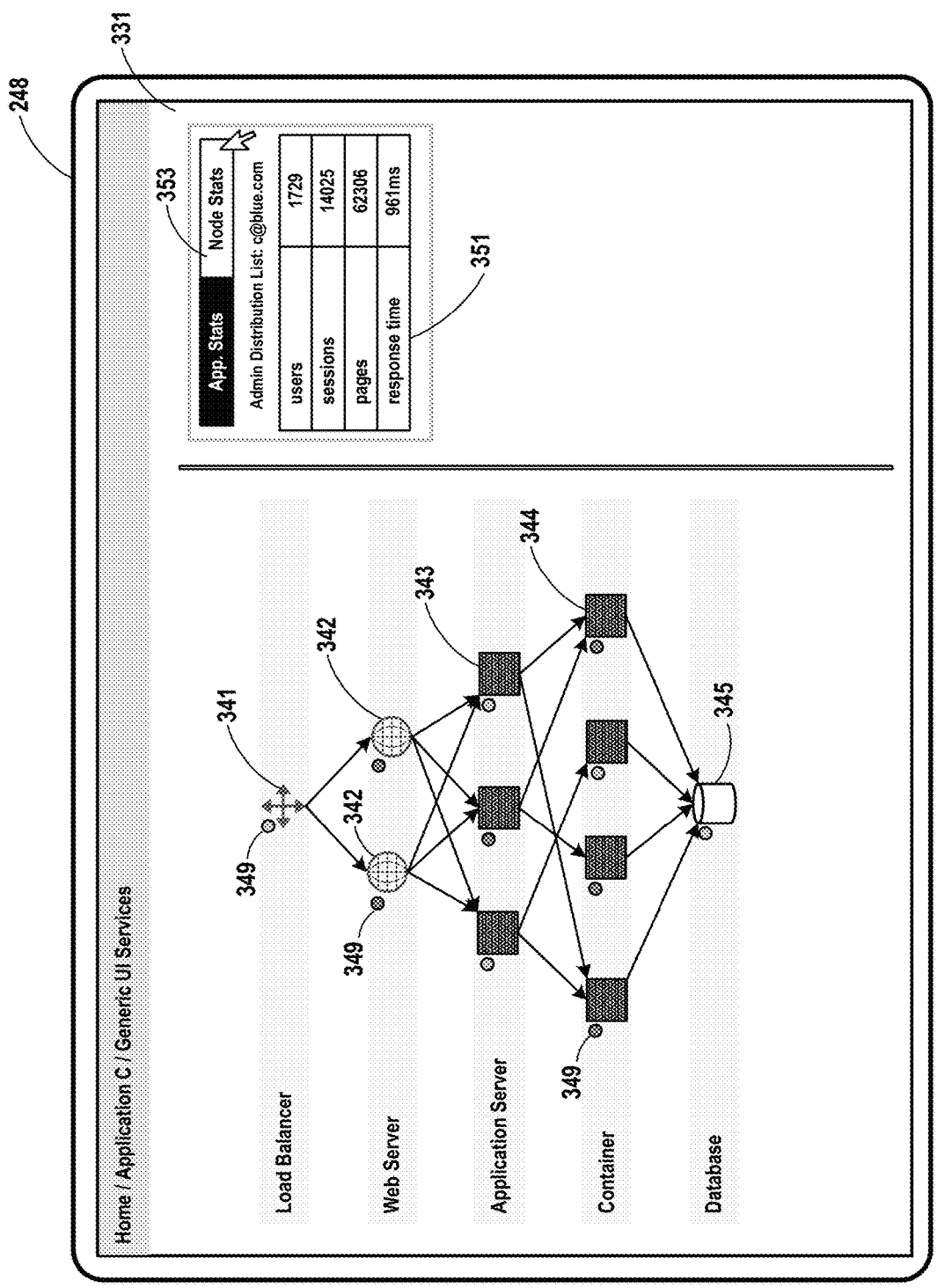

FIG. 4C is an example user interface illustrating a hierarchical view of one or more of the services of FIG. 4B, in accordance with one or more aspects of the present disclosure. User interface 331 of FIG. 4C may be presented at a display device associated with client device 230 of FIG. 2. For instance, referring again to FIG. 2 and FIG. 4B, input device 247 detects input that dashboard module 252 determines corresponds to selection of service 322' within user interface 321. Dashboard module 252 causes communication unit 235 to output a signal over network 105. Communication unit 215 of central monitoring system 210 detects a signal that dashboard module 226 determines corresponds to a request to present a hierarchical view of the services associated with service 322'. Dashboard module 226 collects information from data store 221. Dashboard module 226 causes communication unit 215 to output a signal over network 105 that includes information derived from data store 221. Communication unit 235 of client device 230 detects a signal that dashboard module 252 determines includes information sufficient to generate user interface data. Dashboard module 252 generates the user interface data and causes user interface module 251 to present user interface 331 at display 248, as illustrated in FIG. 4C.

In FIG. 4C, user interface 331 illustrates various nodes arranged in a hierarchical display. For example, in FIG. 4C, load balancer 341 is illustrated as load balancing across two web server nodes 342. Web server nodes 342 route requests to three application server nodes 343, which include a number of container nodes 344, which each access context node 345. Each of load balancer 341, web server nodes 342, application server nodes 343, container nodes 344, and context node 345 may be illustrated with one or more status indicators, which may include a colored dot (e.g., colored dot 349), an icon, highlight color, or other suitable status representation. As with other figures described herein, nodes that are fully available may be colored, highlighted or outlined with green, those that are partially available may be outlined with yellow, those that are unavailable or inoperable may be outlined with red. Nodes in standby mode, in maintenance mode, or not yet brought online might be represented, colored, highlighted, or outlined with one or more other colors. In FIG. 4C, application statistics are included within user interface 331, and are illustrated in application statistics region 351.

Figure 4D:
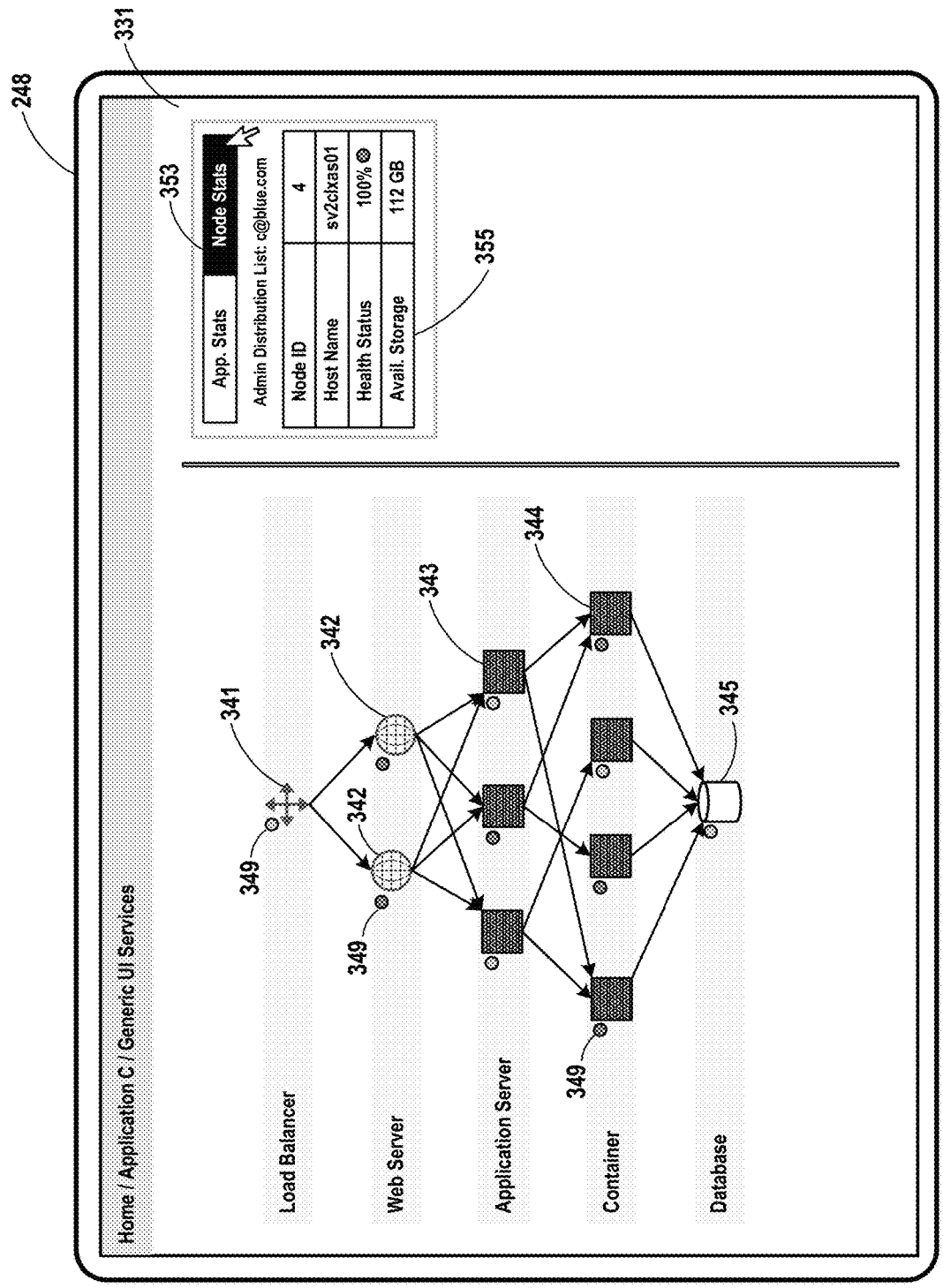

FIG. 4D illustrates a further detail view of node statistics associated a node with illustrated in FIG. 4A, in accordance with one or more aspects of the present disclosure. User interface 331 of FIG. 4C may be updated and presented at a display device associated with client device 230 of FIG. 2. For instance, referring again to FIG. 2 and FIG. 4C, input device 247 detects input that dashboard module 252 determines corresponds to selection of tab 353 within user interface 331. In response, dashboard module 252 updates user interface 331 to present node statistics region 355 within user interface 331, as illustrated in FIG. 4D.

In FIG. 4D, user interface 331 corresponds to user interface 331 of FIG. 4C, but node statistics region 355 is presented in place of application statistics region 351. Although node statistics region 355 is described as being presented in response to detecting a selection of tab 353, in other examples, node statistics region 355 may be presented in response to detecting a selection of one of the nodes presented within user interface 331. For example, input device 247 may detect input that dashboard module 252 determines corresponds to selection of one of application server nodes 343. In response, dashboard module 252 may update user interface 331 to present node statistics region 355, detailing information about the selected or currently active application server node 343.

Figure 4E:
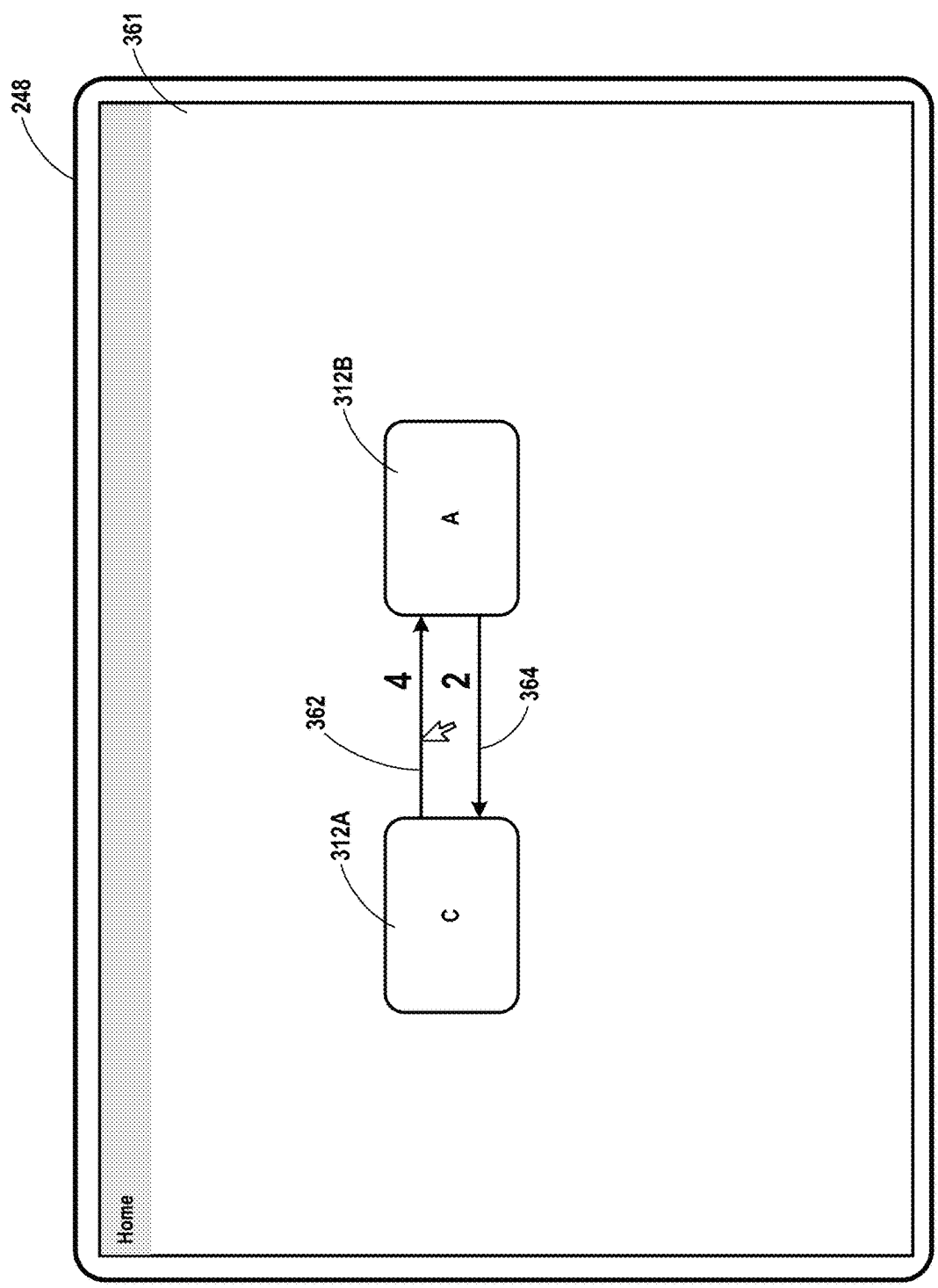

FIG. 4E illustrates a further detail view of communications between two or more applications illustrated in FIG. 4A, in accordance with one or more aspects of the present disclosure. User interface 361 of FIG. 4E may be presented at a display device associated with client device 230 of FIG. 2. For instance, referring again to FIG. 2 and FIG. 4A, input device 247 detects input that dashboard module 252 determines corresponds to selection of connection display element 314' within user interface 311. Dashboard module 252 causes communication unit 235 to output a signal over network 105. Communication unit 215 of central monitoring system 210 detects a signal that dashboard module 226 determines corresponds to a request to present information about communications between two applications shown connected by connection display element 314'. Dashboard module 226 causes communication unit 215 to output a signal over network 105. Communication unit 235 of client device 230 detects a signal that dashboard module 252 determines includes information sufficient to generate user interface data for presentation by a user interface device. Dashboard module 252 generates the user interface data and causes user interface module 251 to present user interface 361 at display 248, as illustrated in FIG. 4E.

In FIG. 4E, user interface 361 illustrates connections between two application display elements. As shown, application display element 312A communicates four types of information to the application corresponding to application display element 312B. Application display element 312B communicates two types of information to the application corresponding to application display element 312A. Connections between application display element 312A and application display element 312B may be color-coded to indicate the aggregate status of the communications paths illustrated. The communication paths may be illustrated with green, yellow, and red to indicate available, partially available, and unavailable paths, respectively. Paths in standby mode, in maintenance mode, or not yet brought online might each be represented with a different color.

Figure 4F:
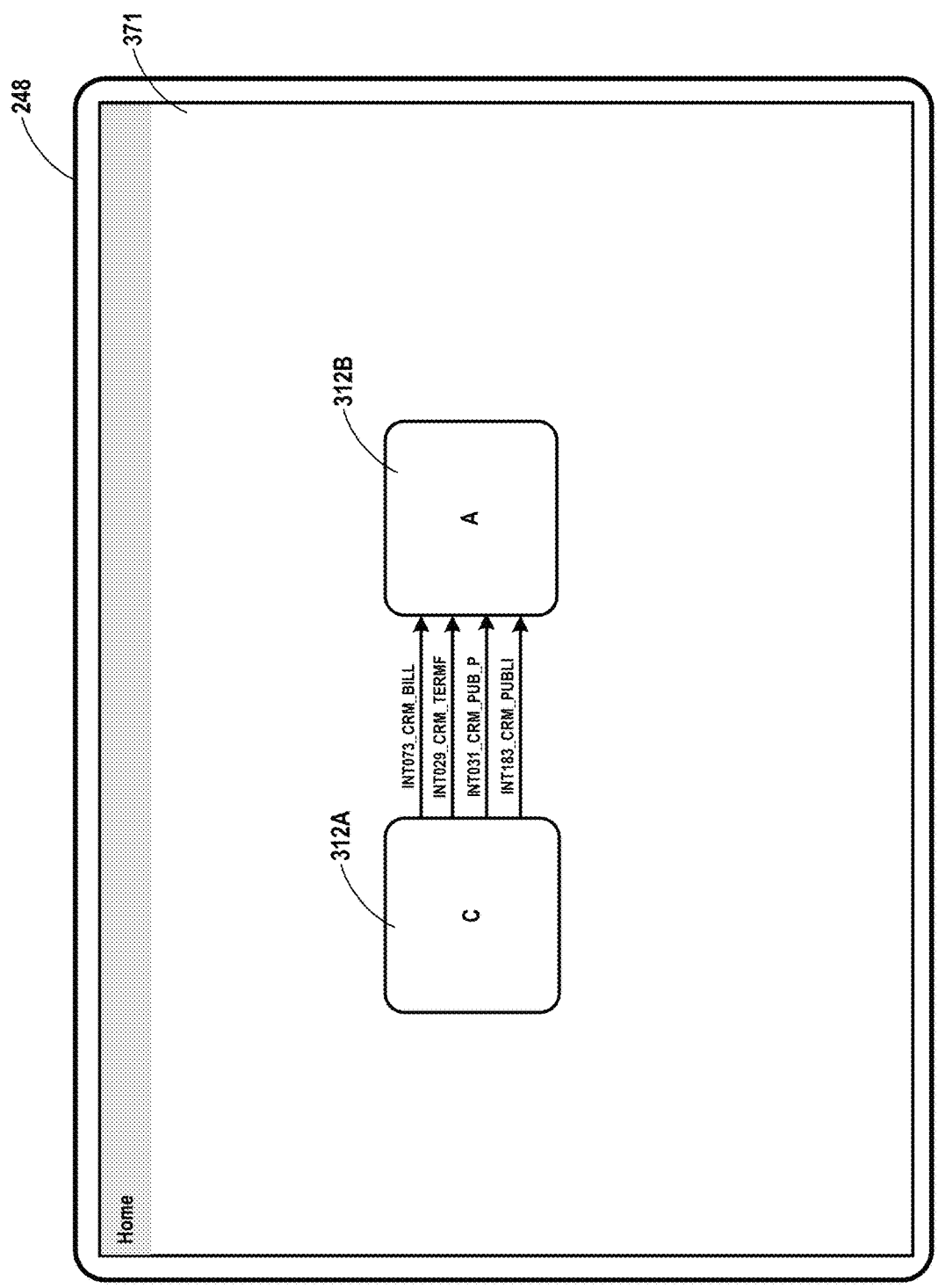

FIG. 4F illustrates a more detailed view of the communications illustrated in FIG. 4E, in accordance with one or more aspects of the present disclosure. User interface 371 of FIG. 4F may be presented at a display device associated with client device 230 of FIG. 2. For instance, referring again to FIG. 2 and FIG. 4E, input device 247 detects input that dashboard module 252 determines corresponds to selection of connection 362 within user interface 361. Dashboard module 252 causes communication unit 235 to output a signal over network 105.

Communication unit 215 of central monitoring system 210 detects a signal that dashboard module 226 determines corresponds to a request to present further information about communications between two applications shown connected by connection 362. Dashboard module 226 causes communication unit 215 to output a signal over network 105.

Communication unit 235 of client device 230 detects a signal that dashboard module 252 determines includes information sufficient to generate user interface data. Dashboard module 252 generates the user interface data and causes user interface module 251 to present user interface 371 at display 248, as illustrated in FIG. 4F.

In FIG. 4F, user interface 371 illustrates further details corresponding to connection 362 as presented within user interface 361. In user interface 371, each of the four connections corresponding to connection 362 is labeled to identify the information, signals, and/or types of information communicated between applications corresponding to application display element 312A to application display element 312B. The individual connections between application display element 312A and application display element 312B shown within user interface 371 may be color-coded to indicate the status of the individual communications paths illustrated.

Figure 5A:
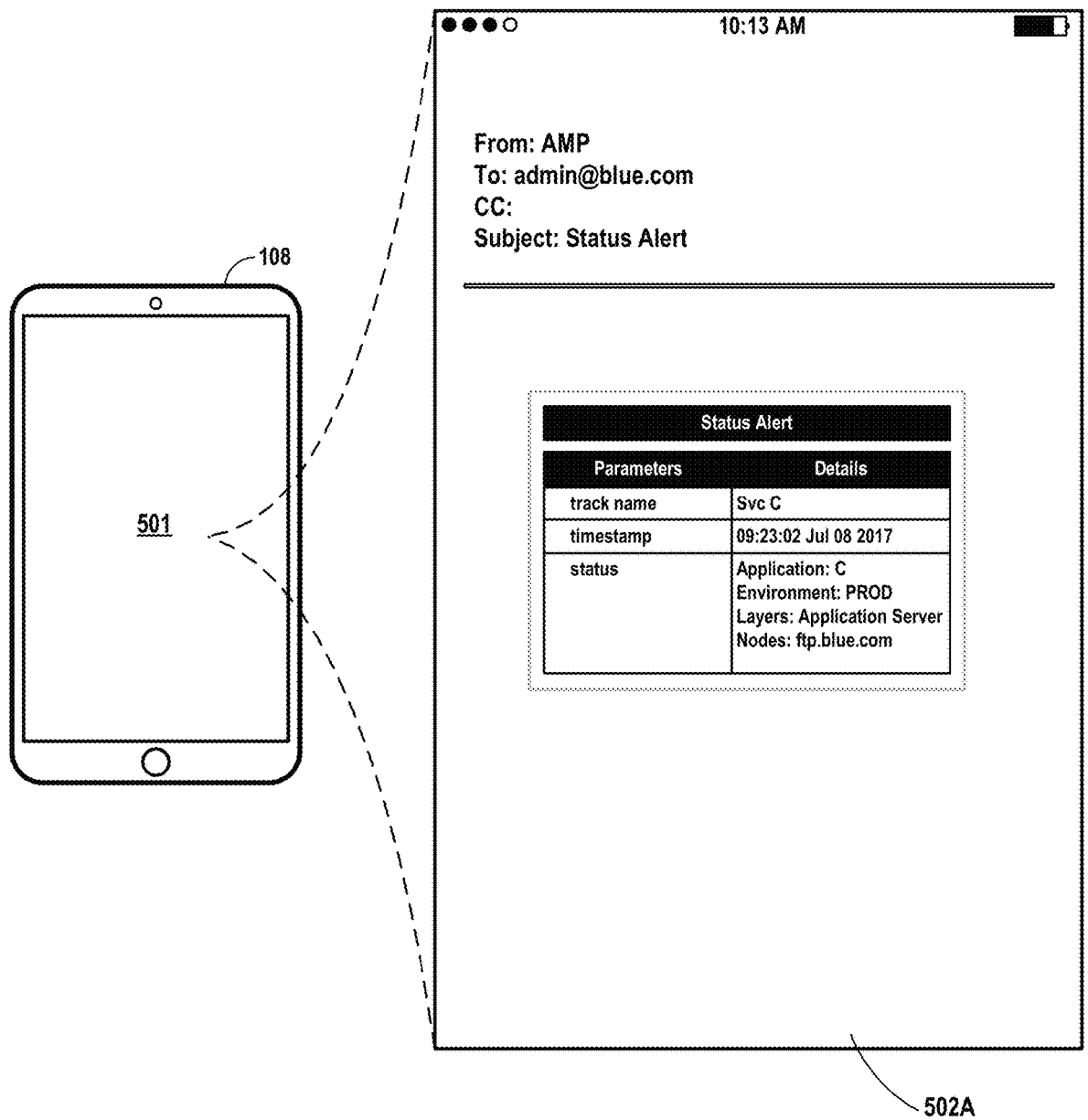
FIG. 5A and FIG. 5B are conceptual diagrams illustrating example alert user interfaces presented by an example mobile device in accordance with one or more aspects of the present disclosure.
Figure 5B:
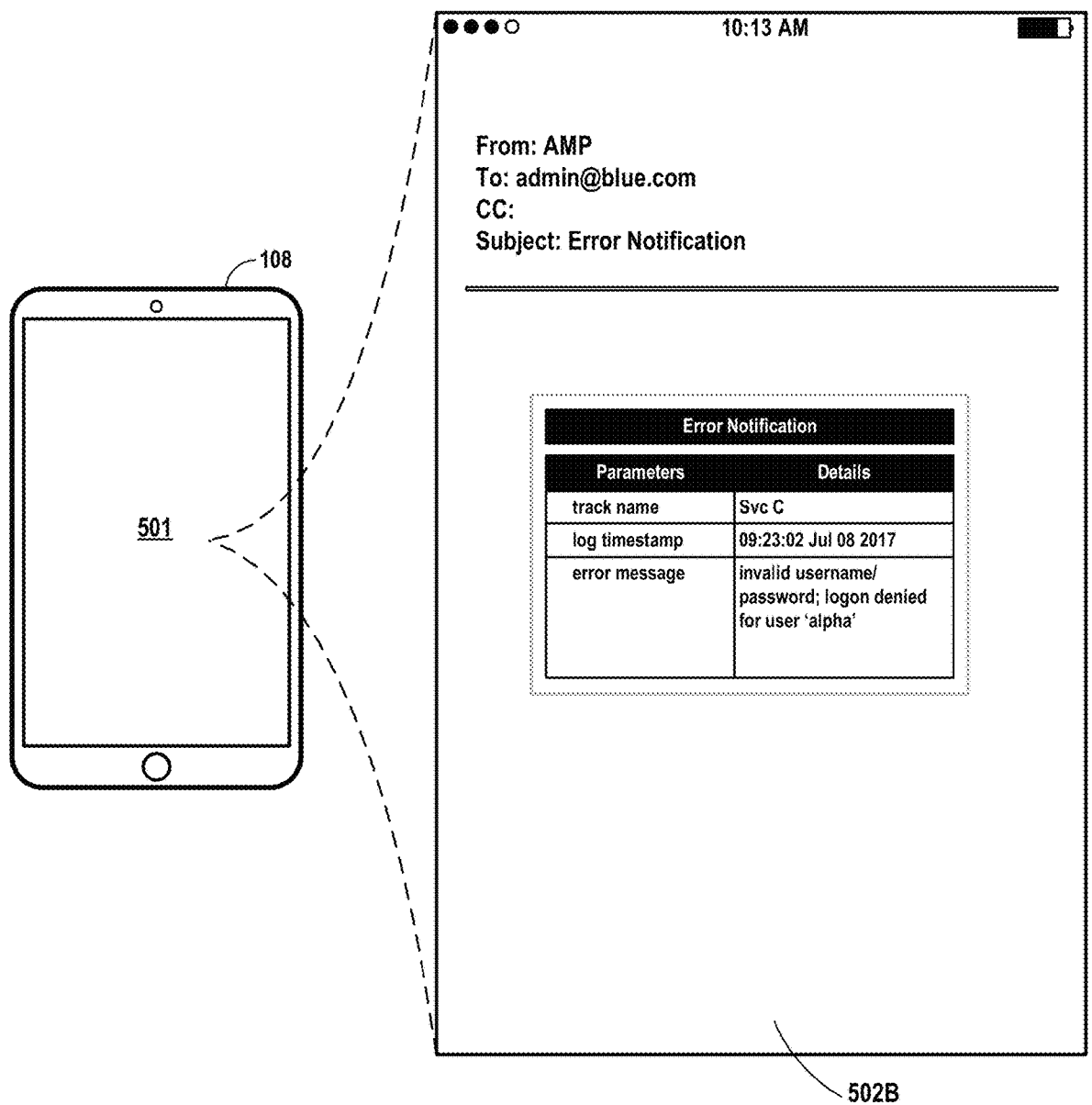

FIG. 5A and FIG. 5B are conceptual diagrams illustrating example user interfaces presented by an example mobile device in accordance with one or more aspects of the present disclosure. User interfaces illustrated in FIG. 5A and FIG. 5B may correspond to a user interface presented by mobile device 108 of FIG. 1A and FIG. 2. One or more aspects of the user interfaces illustrated in FIG. 5A and FIG. 5B may be described herein within the context of system 100 of FIG. 1 and/or FIG. 2. Although the user interfaces illustrated in FIG. 5A and FIG. 5B are shown as graphical user interfaces, other types of interfaces may be presented by mobile device 108, including a text-based user interface, a console or command-based user interface, a voice prompt user interface, or any other appropriate user interface now known or hereinafter developed.

FIG. 5A is an example user interface illustrating an alert presented by a mobile device in response to a status change detected by one or more monitoring agents, in accordance with one or more aspects of the present disclosure. For instance, with reference to FIG. 2, monitoring agent 282 determines that one or more containers 286 has stopped operating correctly and/or has undergone some other status change. Monitoring agent 282 accesses information stored in data store 283 and performs an impact analysis of the status change based on the criticality of the affected node(s). Monitoring agent 282 determines that the impact of the status is such an alert should be sent to one or more devices monitored by network administrators or stakeholders. Monitoring agent 282 causes communication unit 275 to output a signal over network 105. Mobile device 108 detects a signal over network 105 and determines that the signal includes information sufficient to generate user interface data for presentation by a user interface device. Mobile device 108 generates the user interface data and presents user interface 502A at display 501 as illustrated in FIG. 5A. User interface 502A includes information about the status change affecting one or more nodes, such as one or more containers 286. User interface 502A may be presented in the form of an email or other communication received by mobile device 108.

FIG. 5B is an example user interface illustrating an alert presented by a mobile device in response to an error condition logged by one or more monitoring agents, in accordance with one or more aspects of the present disclosure. For instance, with reference to FIG. 2, monitoring agent 282 determines that logged data at host 270 includes one or more error conditions. Monitoring agent 282 analyzes the logged data and performs an impact analysis based on the criticality of the nodes associated with the log entries. Monitoring agent 282 determines that the impact of the error condition is such an alert should be sent to one or more devices monitored by network administrators. Monitoring agent 282 causes communication unit 275 to output a signal over network 105. Mobile device 108 detects a signal over network 105 and determines that the signal includes information sufficient to generate user interface data for presentation by a user interface device. Mobile device 108 generates the user interface data and presents user interface 502B at display 501 as illustrated in FIG. 5B. User interface 502B includes information about the error condition in the logged data affecting one or more nodes and/or components of host 270. As with user interface 502A, user interface 502B may be presented in the form of an email or other communication received by mobile device 108.

Figure 6:
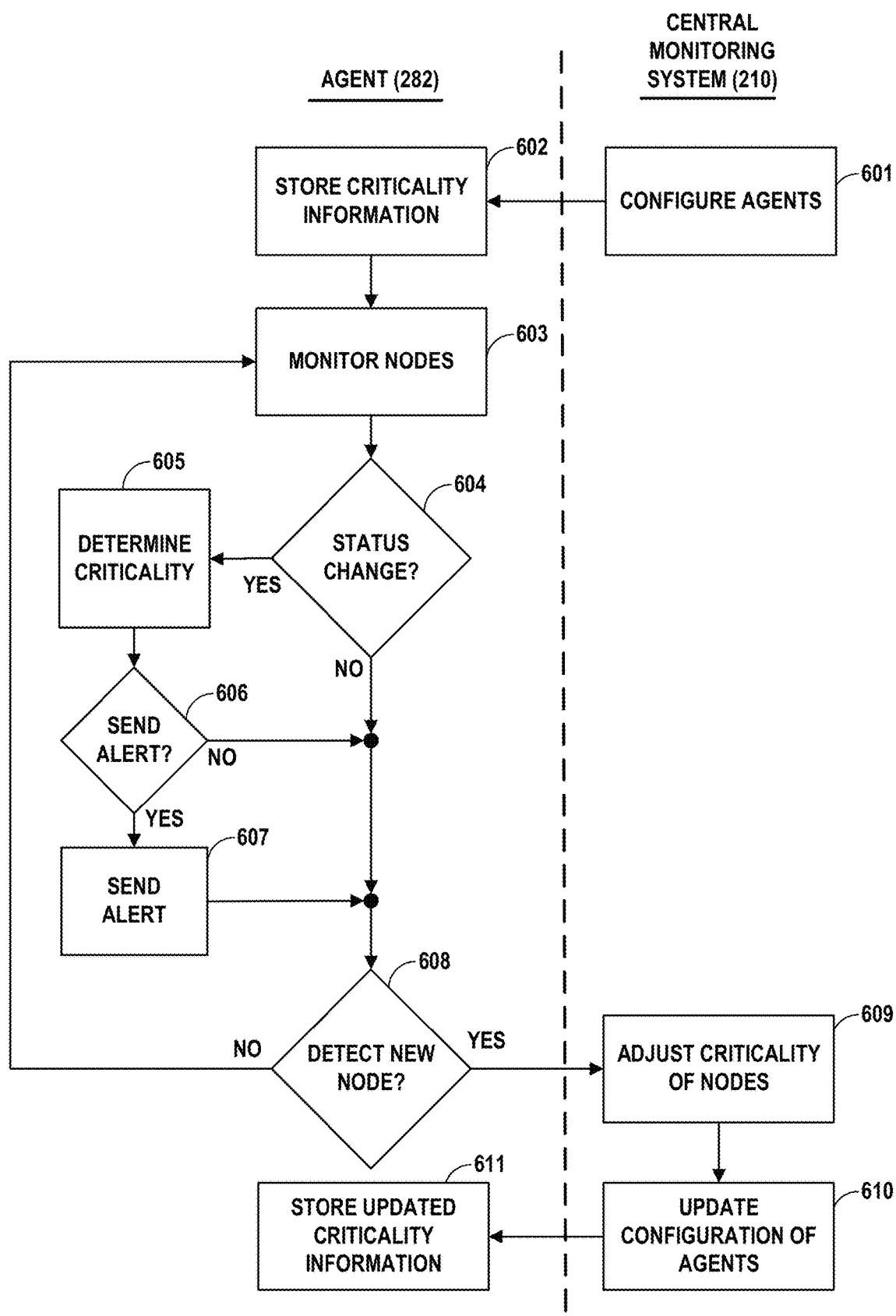
FIG. 6 is a flow diagram illustrating an example process for performing tasks in accordance with one or more aspects of the present disclosure.

FIG. 6 is a flow diagram illustrating an example process for performing tasks in accordance with one or more aspects of the present disclosure. The process of FIG. 6 is illustrated from two different perspectives: operations performed by an example monitoring agent 282 (left-hand column to the left of dashed line), and operations performed by an example central monitoring system 210 (right-hand column to the right of dashed line). In the example of FIG. 6, the illustrated process may be performed by system 200 in the context illustrated in FIG. 2. In other examples, different operations may be performed, or operations described in FIG. 6 as being performed by a particular component, module, system, and/or device may be performed by one or more other components, modules, systems, and/or devices. Further, in other examples, operations described in connection with FIG. 6 may be performed in a difference sequence, merged, or omitted, even where such operations are shown performed by more than one component, module, system, and/or device.

In the example of FIG. 6, and in accordance with one or more aspects of the present disclosure, central monitoring system 210 may configure monitoring agents 282 (601). For instance, in the example of FIG. 2, central monitoring system 210 may communicate over network 105 with one or more monitoring agents 282 executing on hosts 270 and provide information relating to the criticality of one or more nodes executing on host 270.

Monitoring agent 282 may store criticality information (602). For instance, in the example of FIG. 2, monitoring agent 282 may store information received from central monitoring system 210 in data store 283.

Monitoring agent 282 may monitor one or more nodes (603). For instance, still referring to FIG. 2, monitoring agent 282 may monitor one or more of the ports, URLs, processes, containers, virtual machines, network components, and other aspects of host 270.

Monitoring agent 282 may detect a status change (604). For instance, monitoring agent 282 may determine that one or more of the containers executing on host 270 has stopped operating correctly, is no longer operable, and/or has undergone some other status change.

Monitoring agent 282 may determine the criticality of the status change (605). For instance, monitoring agent 282 may determine, based on the criticality information stored in data store 283, that the status change impacts system 200 to such an extent that an alert should be sent (606). Monitoring agent 282 may send an alert notifying a network administrator of the status change (607). Alternatively, monitoring agent 282 may determine that the criticality of the status change is such that an alert should not be sent.

Monitoring agent 282 may detect that a new node has been added to system 200 (608). For instance, monitoring agent 282 may determine, during the course of monitoring aspects of host 270, that a new container has been instantiated on host 270 or on another host. Monitoring agent 282 may automatically communicate information about the new node to central monitoring system 210.

Central monitoring system 210 may determine the effect of the new node being added to system 200, and adjust the criticality of nodes within system 200 (609). For instance, central monitoring system 210 may analyze a set of default or customized rules or templates for rules to classify the new node. In some examples, a set of rules are predefined for one or more nodes (e.g., Tomcat, Apache web server), so that central monitoring system 210 is able to determine if the new node can be classified according to one or more of the predefine nodes rule sets.

Central monitoring system 210 may communicate with monitoring agent 282 to update the configuration of monitoring agent 282 in light of the adjustments to the criticality of the nodes resulting from the addition of the new node (610). Monitoring agent 282 may store the updated criticality information (611). For instance, monitoring agent 282 may store the information in data store 283.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
    determining, by a computing system, a criticality assessment for each of a plurality of nodes within a network;
    configuring, by the computing system, a plurality of agents executing on a plurality of hosts within the network, wherein the plurality of agents are configured, based on the criticality assessments, to monitor at least some of the plurality of nodes for status changes;
    receiving, by the computing system, information about a new node that has been added to the network;
    determining, by the computing system, for an affected node included within the plurality of nodes that is affected by the new node being added to the network, an updated criticality assessment; and
    reconfiguring, by the computing system and based on the updated criticality assessment, an agent included within the plurality of agents that monitors the affected node.

2. The method of claim 1, wherein determining the updated criticality assessment includes:
    identifying a type associated with the new node;
    applying a rule set associated with the type to determine criticality information for the new node; and
    applying a rule set to position the new node within a hierarchy.

3. The method of claim 2, wherein applying the rule set associated with the type to determine criticality information for the new node further includes:
    determining an effect that adding the new node has on other nodes within the network.

4. The method of claim 1,
    wherein the affected node is a first application configured to execute on one of the plurality of hosts within the network computing system, and
    wherein the new node is a second application configured to execute on the one of the plurality of hosts within the network.

5. The method of claim 1, further comprising:
    receiving, by the computing system, information about a removed node that has been removed from the network;
    determining, by the computing system, for the affected node and based on the information about the removed node, a further updated criticality assessment; and
    reconfiguring, by the computing system and based on the further updated criticality assessment, the agent that monitors the affected node.

6. The method of claim 1, wherein determining the updated criticality assessment includes:
sending, to a central monitoring system, information about the affected node; and
receiving, from the central monitoring system, information about the updated criticality assessment for the affected node.

7. The method of claim 1,
wherein the node is at least one of a port, URL, application, process, device, host, server, database, virtual machine, container, interface, or network component.

8. A computing system comprising:
a storage device; and
processing circuitry having access to the storage device and configured to:
determine a criticality assessment for each of a plurality of nodes within a network,
configure a plurality of agents executing on a plurality of hosts within the network, wherein the plurality of agents are configured, based on the criticality assessments, to monitor at least some of the plurality of nodes for status changes,
receive information about a new node that has been added to the network,
determine, for an affected node included within the plurality of nodes that is affected by the new node being added to the network, an updated criticality assessment, and
reconfigure, based on the updated criticality assessment, an agent included within the plurality of agents that monitors the affected node.

9. The computing system of claim 8, wherein to determine the updated criticality assessment, the processing circuitry is further configured to:
identify a type associated with the new node;
apply a rule set associated with the type to determine criticality information for the new node; and
apply a rule set to position the new node within a hierarchy.

10. The computing system of claim 9, wherein to apply the rule set associated with the type to determine criticality information for the new node, the processing circuitry is further configured to:
determine an effect that adding the new node has on other nodes within the network.

11. The computing system of claim 8,
wherein the affected node is a first application configured to execute on the computing system, and
wherein the new node is a second application configured to execute on the computing system.

12. The computing system of claim 8, wherein the processing circuitry is further configured to:
receive information about a removed node that has been removed from the network;
determine, for the affected node and based on the information about the removed node, a further updated criticality assessment; and
reconfigure, based on the further updated criticality assessment, the agent that monitors the affected node.

13. The computing system of claim 8, wherein to determine the updated criticality assessment, the processing circuitry is further configured to:
send, to a central monitoring system, information about the affected node; and
receive, from the central monitoring system, information about the updated criticality assessment for the affected node.

14. The computing system of claim 8,
wherein the node is at least one of a port, URL, application, process, device, host, server, database, virtual machine, container, interface, or network component.

15. A non-transitory computer-readable storage medium comprising instructions that, when executed, configure processing circuitry of a computing system to:
determine a criticality assessment for each of a plurality of nodes within a network;
configure a plurality of agents executing on a plurality of hosts within the network, wherein the plurality of agents are configured, based on the criticality assessments, to monitor at least some of the plurality of nodes for status changes;
receive information about a new node that has been added to the network;
determine, for an affected node included within the plurality of nodes that is affected by the new node being added to the network, an updated criticality assessment; and
reconfigure, based on the updated criticality assessment, an agent included within the plurality of agents that monitors the affected node.

16. The non-transitory computer-readable storage medium of claim 15, wherein the instructions that configure the processing circuitry to determine the updated criticality assessment further include instructions that configure the processing circuitry to:
identify a type associated with the new node;
apply a rule set associated with the type to determine criticality information for the new node; and
apply a rule set to position the new node within a hierarchy.

17. The non-transitory computer-readable storage medium of claim 16, wherein the instructions that configure the processing circuitry to apply the rule set associated with the type to determine criticality information for the new node further include instructions that configure the processing circuitry to:
determine an effect that adding the new node has on other nodes within the network.

18. The non-transitory computer-readable storage medium of claim 15,
wherein the affected node is a first application configured to execute on the computing system, and
wherein the new node is a second application configured to execute on the computing system.

19. The non-transitory computer-readable storage medium of claim 15, further comprising instructions that configure the processing circuitry to:
receive information about a removed node that has been removed from the network;
determine, for the affected node and based on the information about the removed node, a further updated criticality assessment; and
reconfigure, based on the further updated criticality assessment, the agent that monitors the affected node.

20. The non-transitory computer-readable storage medium of claim 15, wherein the instructions that configure the processing circuitry to determine the updated criticality assessment further include instructions that configure the processing circuitry to:
send, to a central monitoring system, information about the affected node; and receive, from the central monitoring system, information about the updated criticality assessment for the affected node.

\* \* \* \* \*